(12) United States Patent
Tanaka et al.

(10) Patent No.: US 8,681,319 B2
(45) Date of Patent: Mar. 25, 2014

(54) LASER RADAR FOR THREE-DIMENSIONAL SCANNING

(75) Inventors: Hideyuki Tanaka, Nagoya (JP); Yoshiki Mitsuno, Obu (JP)

(73) Assignee: Denso Wave Incorporated, Tokyo (JP)

( * ) Notice: Subject to any disclaimer, the term of this patent is extended or adjusted under 35 U.S.C. 154(b) by 61 days.

(21) Appl. No.: 13/423,656

(22) Filed: Mar. 19, 2012

(65) Prior Publication Data

US 2012/0249996 A1  Oct. 4, 2012

(30) Foreign Application Priority Data

Mar. 31, 2011  (JP) .................................. 2011-077731

(51) Int. Cl.
*G01C 3/08* (2006.01)

(52) U.S. Cl.
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 7,545,485 | B2 | 6/2009 | Okada et al. | |
|---|---|---|---|---|
| 2009/0002678 | A1* | 1/2009 | Tanaka et al. | 356/4.01 |
| 2009/0123158 | A1 | 5/2009 | Ray et al. | |

FOREIGN PATENT DOCUMENTS

| DE | 10 2006 060 108 A1 | 6/2008 |
|---|---|---|
| EP | 2 187 231 A2 | 5/2010 |
| EP | 2 378 309 A1 | 10/2011 |
| JP | B2-2789741 | 8/1998 |
| JP | A-2001-174721 | 6/2001 |
| JP | A-2008-134163 | 6/2008 |
| JP | A-2009-098111 | 5/2009 |

OTHER PUBLICATIONS

Nov. 25, 2013 Office Action issued in German Patent Application No. 102012102244.5 (with translation).
Nov. 21, 2013 Office Action issued in Chinese Patent Application No. 201210073199.1 (with translation).

* cited by examiner

*Primary Examiner* — Luke Ratcliffe
(74) *Attorney, Agent, or Firm* — Oliff PLC

(57) ABSTRACT

In a laser radar, a first scanning member scans a laser beam in a virtual plane passing through an axis. A control means controls displacements of the first scanning member to change a scan beam angle in the plane. A second scanning member deflects the scanned laser beam and again scans the deflected laser beam toward an external space. A light collecting means collects reflected light. A driving means rotates both the second scanning member and the light collecting means about the axis. The second scanning member has a deflecting surface to deflect the laser beam. The deflecting surface is formed around the axis and has a plurality of reflecting surfaces coaxially arranged centering on the axis. The reflecting surfaces have different inclinations with respect to a horizontal plane perpendicular to the axis.

20 Claims, 30 Drawing Sheets

LASER RADAR FOR THREE-DIMENSIONAL SCANNING

CROSS-REFERENCE TO RELATED APPLICATION

This application is based on and claims the benefit of priority from earlier Japanese Patent Application No. 2011-077731 filed Mar. 31, 2011, the description of which is incorporated herein by reference.

BACKGROUND OF THE INVENTION

1. Technical Field of the Invention

The present invention relates to a laser radar for three dimensional scanning, and in particular to a laser radar that three-dimensionally scan the space outside the laser radar using a laser beam.

2. Related Art

It is well known to use a laser beam to detect a distance to a target or direction of the target. A patent document JP-2789741-B, for example, discloses a device relating to such a technique. The device disclosed in this patent document includes a light isolator on the axis of a laser beam emitted from a laser beam generating means to transmit the laser beam and to reflect the light reflected from a target to a detecting means. Further, the device includes a concave mirror on the light axis of the laser beam transmitted through the light isolator. The concave mirror is adapted to rotate about the light axis of the laser beam to reflect the laser beam toward an external space. The concave mirror also reflects the light reflected from a target toward the light isolator to enable horizontal scanning covering an angle of 360°.

The technique disclosed in the patent document JP-2789741-B enables 360° horizontal scanning using the concave mirror and thus the detection range (scan range of a laser beam) is enlarged to the entire peripheral area of the device. However, this raises a problem that the detection range is limited to a plane. Specifically, since scanning is limited to a predetermined plane (scan plane), a laser beam reflected externally from the concave mirror which goes out of the scan plane is not able to conduct detection. Accordingly, a target which is present out of the scan plane cannot be detected. Even when a target is present in the scan plane, it is difficult to three-dimensionally detect the target.

To take measures against this problem, patent documents JP-2008-134163-A or JP-2009-098111-A discloses a technique that enables detection of a target in a three-dimensional space. For example, the patent document JP-2008-134163-A discloses a three-dimensional distance-measuring apparatus including a two-dimensional distance-measuring unit and a second rotating mechanism. The two-dimensional distance-measuring unit includes a rotating body that rotates about a given rotational axis. The second rotating mechanism rotates/drives the two-dimensional distance-measuring unit about a second axis obliquely intersecting the first axis. The second rotating mechanism includes a first bracket and a rotatable arm. The first bracket is pivotally supported about a third axis which is perpendicular to the second axis. The rotating arm is connected to a predetermined position on the first axis via a free joint mechanism. The rotating arm is rotated/driven by a driving mechanism to change a roll angle and a pitch angle of the first axis. Thus, the entire two-dimensional distance-measuring unit is pivoted to perform three-dimensional scanning.

However, the method of pivotally moving the two-dimensional distance-measuring unit as a whole together with its casing, as disclosed in JP-2008-134163-A, unavoidably increases the size of the operating mechanism (second rotating mechanism and the driving source (second motor)). This is quite disadvantageous from the aspect of reducing weight and size of the apparatus. Further, from the structural viewpoint of driving the two-dimensional distance-measuring unit in its entirety, mechanical or electrical load caused in the operating mechanism or the driving source is unavoidably large. Thus, considerably large torque, electrical power and the like are required in driving the unit, making it problematically difficult to perform scanning at high speed.

In particular, in the configuration disclosed in JP-2008-134163-A, a part (two-dimensional distance-measuring unit) driven by a three-dimensional-motion motor (second motor) is structurally much larger and heavier than a part (rotating body) driven by a horizontal-scan motor (first motor). Further, the motion provided by the second motor accompanies pivotal movement of the first bracket and the free joint mechanism. With this configuration, the motion of the second motor necessarily becomes slow, compared to the simple rotation of the light-weight rotating body on the side of the first motor. Accordingly, when high-speed scan is attempted by rotating the components of the first motor at high speed, the components of the second motor cannot follow the high-speed rotation. As a result, high-speed scan is encumbered.

On the other hand, the patent document JP-2009-098111-A discloses a laser radar having a configuration in which a laser beam from a laser diode is reflected to the side of a deflector by a pivoted mirror. In the laser radar, the pivotal movement of the pivoted mirror is controlled so that the direction of the laser beam incident on the deflector is changed. Thus, the radiation direction of the laser beam from the deflector is vertically changed.

As shown, for example, in JP-2009-098111-A, the configuration of displacing the pivoted mirror reduces the size and weight of the part (pivoted mirror) contributing to three-dimensional recognition, and thus reduces the mechanical and electrical load of the device, compared to the configuration disclosed in the patent document JP-2008-134163-A. However, in order to well perform three-dimensional recognition in a large rotation range using the configuration shown by JP-2009-098111-A, the pivoted mirror is required to be moved in a complicated manner. For example, in performing laser scan by pivotally moving the pivoted mirror as shown in JP-2009-098111-A, the driving of the pivoted mirror may be simplified and laser scan by the pivoted mirror may be based on a simple line scan (one-dimensional scan), so that high-speed driving is achieved.

However, this creates a phenomenon of not changing an incident angle (angle made between a laser beam emitted from the deflector and a horizontal plane) of the laser beam. This phenomenon is created when the deflector is at a rotational position where the deflector is oriented to a direction perpendicular to the direction in which the laser beam for line scanning is moved (perpendicular to the scan plane incident on the deflector). Thus, three-dimensional recognition is disabled in the vicinity of this rotational position. In order to eliminate such a problem, the pivoted mirror is required to be two-dimensionally moved in a complicated manner so that the laser beam is multidirectionally moved, instead of allowing the pivoted mirror to perform laser scan based on a simple line scan (one-dimensional scan). However, it is difficult to increase speed in such a complicated pivotal movement, and the complicated pivotal movement necessarily involves a complicated configuration and control method.

SUMMARY

Hence, it is desired to realize, in a laser radar enabling three-dimensional recognition of targets around the laser radar, a configuration that enables high-speed laser beam scanning, while reducing size and weight of the laser radar.

In order to achieve the above object, the laser radar includes, as its one aspect: a laser beam generating means for generating a laser beam; a first scanning member for scanning the laser beam from the laser beam generating means in a virtual plane that passes through a predetermined axis; a control means for controlling a displacement of the first scanning member so that an angle of the scan beam in the plane is changed; a second scanning member for deflecting the laser beam scanned by the first scanning member and scanning the deflected laser beam toward an external space, the scan member being rotatable about the axis; a light detecting means for detecting reflected light that is the laser beam reflected in and returned from the external space; a light collecting means for collecting the reflected light to the light detecting means, the light collecting means being integrally formed with the second scanning member; and a driving means for driving and rotating both the second scanning member and the light collecting means about the axis, wherein: the second scanning member has a deflecting surface arranged on a side on which the laser beam is incident and formed to deflect the laser beam; the deflecting surface is formed at least in a portion of a region along a circumferential direction of the axis, the deflecting surface being a plurality of reflecting surfaces coaxially arranged centering on the axis; and the plurality of reflecting surfaces are each formed to have a different inclination with respect to a horizontal plane which is perpendicular to the axis.

With this configuration, the laser beam can be radiated to the deflecting surface (i.e., the plurality of reflecting surfaces) based on line scanning, the deflecting surface being stepped and coaxially configured centering on the axis. Thus, reflected light (radiation light toward an external space) is differently directed from the individual reflecting surfaces having a different inclination.

In the process of the relative movement of the line scan position on the deflecting surface, the laser beam to be moved in the virtual plane is ensured to be incident on the individual plurality of reflecting surfaces. Thus, the laser beam is reflected by the individual reflecting surfaces in spite of the change of orientation of the deflecting surface due to the rotation of the deflector. In this way, the laser beam is three-dimensionally scanned around the laser radar, changing its inclination angle (angle with respect to the horizontal plane). In particular, since the laser beam can be radiated to the deflecting surface based on line scanning (one-dimensional scan), laser scanning is conducted for the deflecting surface at high speed, without increasing the size of the driving mechanism or complicating the driving mechanism. Further, the laser radar is able to three-dimensionally recognize the presence of a target around the laser radar at higher speed.

Further, the plurality of reflecting surfaces are formed covering an entire circumferential range centering on the axis.

With this configuration, the laser beam is radiated to the individual reflecting surfaces, whichever direction the deflector may be oriented to. Thus, the laser radar is able to cyclopedically and three-dimensionally recognize a target present around the laser radar.

Further, for example, every time the deflector rotates N number of times (N is a natural number), the control means change the orientation of the first scanning member. Thus, a surface among the plurality of reflecting surfaces, on which the laser beam is incident, is changed every N-time rotation of the deflector.

With this configuration, the orientation of the first scanning member only has to be changed every N-time rotation of the deflector. Thus, the load imposed in changing the orientation is reduced, compared to the configuration in which the orientation is changed several times during one rotation of the deflector. In particular, in the configuration of changing the orientation several times in one rotation, it is difficult to rotate the deflector at high speed because the time taken for changing the orientation several times has to be taken into account. In this regard, the change of orientation on an N-time rotation basis as described above enables high-speed rotation of the deflector, while facilitating the change at appropriate timing without delay. Thus, the laser radar is more advantageously used in conducting high-speed three-dimensional recognition of targets.

DETAILED DESCRIPTION OF THE PREFERRED EMBODIMENTS

With reference to the accompanying drawings, hereinafter are described some embodiments of a laser radar according to the present invention. This laser radar is also called LIDAR (Light Detection and Ranging, or Laser Imaging Detection and Ranging).

(First Embodiment)

Referring to FIGS. 1 to 14 and FIG. 29, a first embodiment to which the present invention is applied is described.

Figure 1:
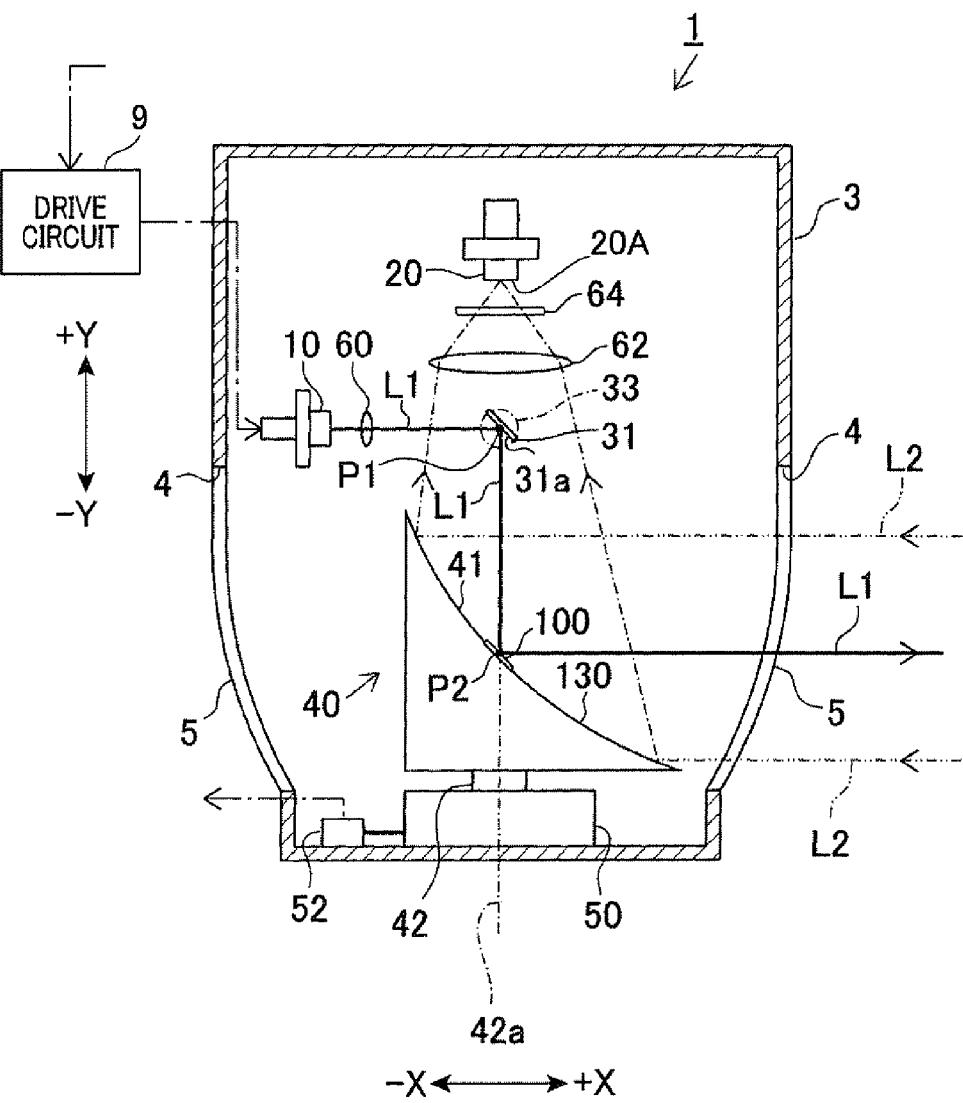
FIG. 1 is a schematic cross-sectional view illustrating a laser radar according to a first embodiment of the present invention.
Figure 2:
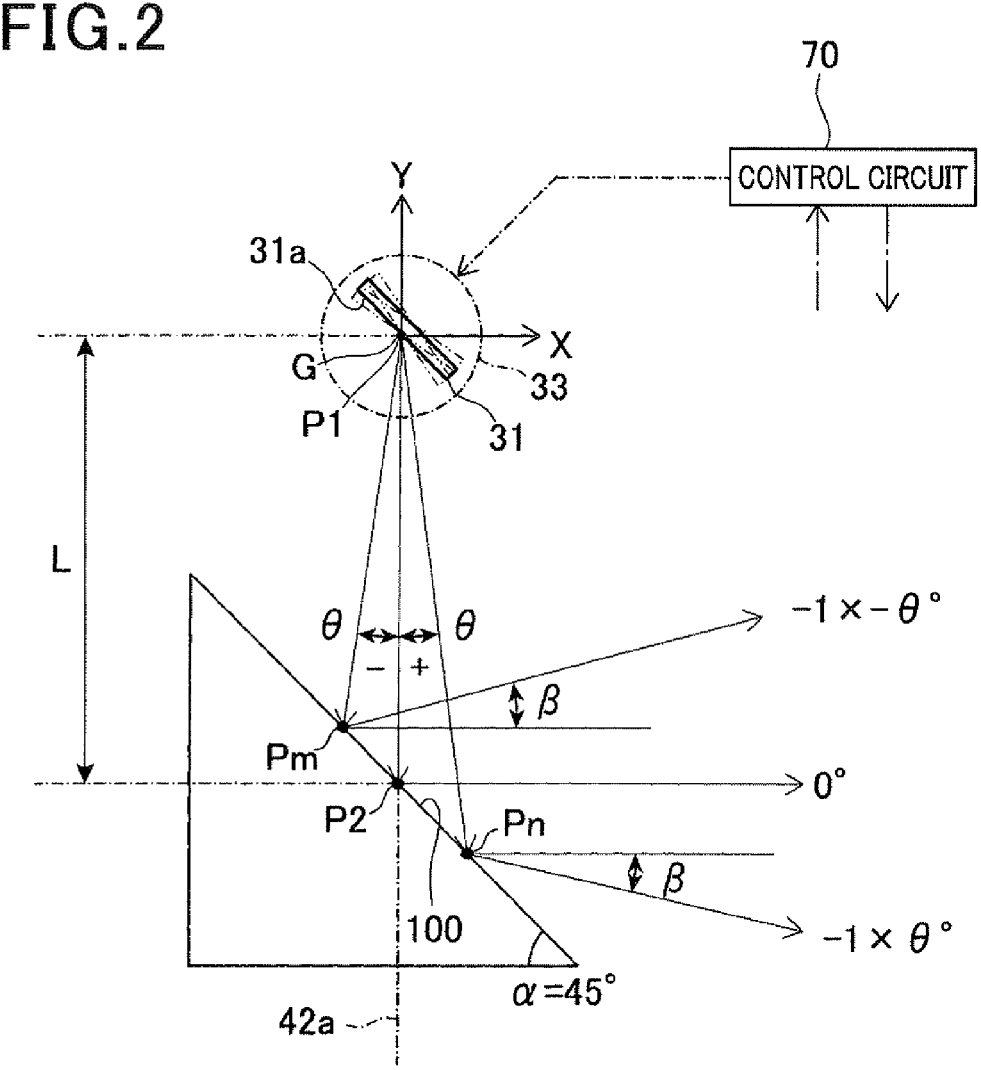
FIG. 2 is a diagram illustrating a correlation between angle of laser beam radiated to a deflector and radiation angle from the deflector.

First, general configuration of a laser radar 1 according to the first embodiment is described. FIG. 1 is a schematic cross-sectional view illustrating the laser radar 1. FIG. 2 is a diagram illustrating a correlation between angle of laser beam radiated to a deflector and a radiation angle from the deflector.

As shown in FIG. 1, the laser radar 1 includes a laser diode 10 and a photodiode 20. The laser radar 1 is configured to detect a distance to and a direction of a target of detection.

The laser diode 10 corresponds to the laser beam generating means and is made up of a known laser diode. The laser diode 10 is supplied with pulsed current from a drive circuit 9 to intermittently emit a pulsed laser beam (laser beam L1) at a predetermined interval according to the pulsed current.

The photodiode 20 is made up of a known photodiode, such as an avalanche photodiode. The photodiode 20 is ensured to receive, through its light-receiving window 20A, the light L2 that is a reflection of the laser beam L1 generated by the laser diode 10 and reflected from a target present in an external space, and convert the received light L2 into an electrical signal. The photodiode 20 is ensured to take the reflected light L2 within a predetermined field-of-view range. FIG. 1 shows a state where the laser beam L1 radiated in a horizontal direction is received as the light L2 reflected from a target present in an external space. It should be appreciated that the horizontal direction here refers to a lateral direction in a state where the laser radar 1 is placed as shown in FIG. 1, i.e. the direction in an X-Z plane (horizontal plane) that will be described later.

The photodiode 20 corresponds to the light detecting means. The laser radar 1 also includes a deflection unit 40 which deflects a laser beam toward the external space. The photodiode 20 has a function of detecting a light reflected from the target, the light corresponding to the laser beam deflected by the deflector 41.

The laser beam L1 radiated from the laser diode 10 has a light axis on which a lens 60 is provided. The lens 60 is configured as a collimating lens having a function of converting the laser beam L1 from the laser diode 10 to substantially parallel light rays.

The laser light L1 that has passed the lens 60 advances along a light path on which a mirror 31 is arranged. The mirror 31 corresponds to the first scanning (deflecting or reflecting) member and has a function of guiding the laser beam L1 from the laser diode 10 toward a rotating deflection unit 40 described later. The angle of the mirror 31 on an X-Y plane described later is configured to be changed (i.e. displaced) by the driving force of an actuator 33. Accordingly, the mirror 31 is configured to reflect the laser beam L1 passed through the collimating lens 60 in a direction altered by the posture (in this case, the angle) of the mirror 31.

The actuator 33 is driven receiving a command from a control circuit 70 (see FIG. 2) described later. The actuator 33 is configured to change the angle of the mirror 31, so that the direction of the laser beam L1 reflected by the mirror 31 is changed in and along a virtual plane (X-Y plane described later). For example, the actuator 33 is made up of a stepping motor that rotates the mirror 31 about a predetermined rotational axis. In FIGS. 1 and 2, the mirror 31 is rotated about a rotational axis G provided on a reflecting surface 31a of the mirror 31

In FIG. 1, the direction of the rotational axis (pivot axis) G is perpendicular to the direction of the laser beam from the collimating lens 60. The rotational axis G is also perpendicular to the direction of the center of rotation (direction of a central axis 42a) of the rotating deflection unit 40 described later. The center axis 42a functions as a predetermined axis given to the laser radar.

In the present specification the direction from the collimating lens 60 toward the mirror 31 is defined as an X axis, while the direction of the central axis 42a is defined as a Y axis. The direction of the rotational axis G is defined as a Z axis perpendicular to the X and Y axes. The actuator 33 pivotally moves the mirror 31 so that the laser beam from the mirror 31 moves on a virtual plane (X-Y plane) including these directions (direction of the laser beam toward the mirror 31 and direction of the central axis 42a). Thus, line scan is ensured to be conducted to a deflector 41 described later. In this configuration, the rotational axis G is positioned on the central axis 42a, for intersection with the central axis 42a. The intersecting position corresponds to a reflection position P1. Accordingly, the reflection position P1 is an unchanged fixed position.

The laser beam L1 reflected by the mirror 31 has a light axis on which the rotating deflection unit 40 is provided. The rotating deflection unit 40 includes the deflector 41 configured to be rotatable about the central axis 42a, and a motor 50 that rotates/drives the deflector 41. The deflector 41 corresponds to the second scanning (deflecting or reflecting) member. The rotating deflection unit 40 has a function of rotating the deflector 41, while allowing the deflector 41 to deflect (reflect) the laser beam L1 generated by the laser diode 10 toward an external space (space outside a casing 3).

The rotating deflection unit 40 is mainly composed of the deflector 41, a shaft 42, the motor 50 and a rotation angle sensor 52. The deflector 41 includes a scan beam reflector 100 and a concave mirror 130, while being rotatably supported centering on the central axis 42a. At whichever rotational position the deflector 41 may be located, the deflecting surface 100a for receiving the laser beam L1 and the reflected light L2 is ensured to be oriented obliquely upward.

The scan beam reflector 100 is configured to reflect the laser beam L1 from the laser diode 10 (specifically, the laser beam L1 to be line-scanned by the mirror 31) toward an external space. The scan beam reflector 100 is one of the features of the present embodiment. The detailed configuration is described later.

Figure 3:
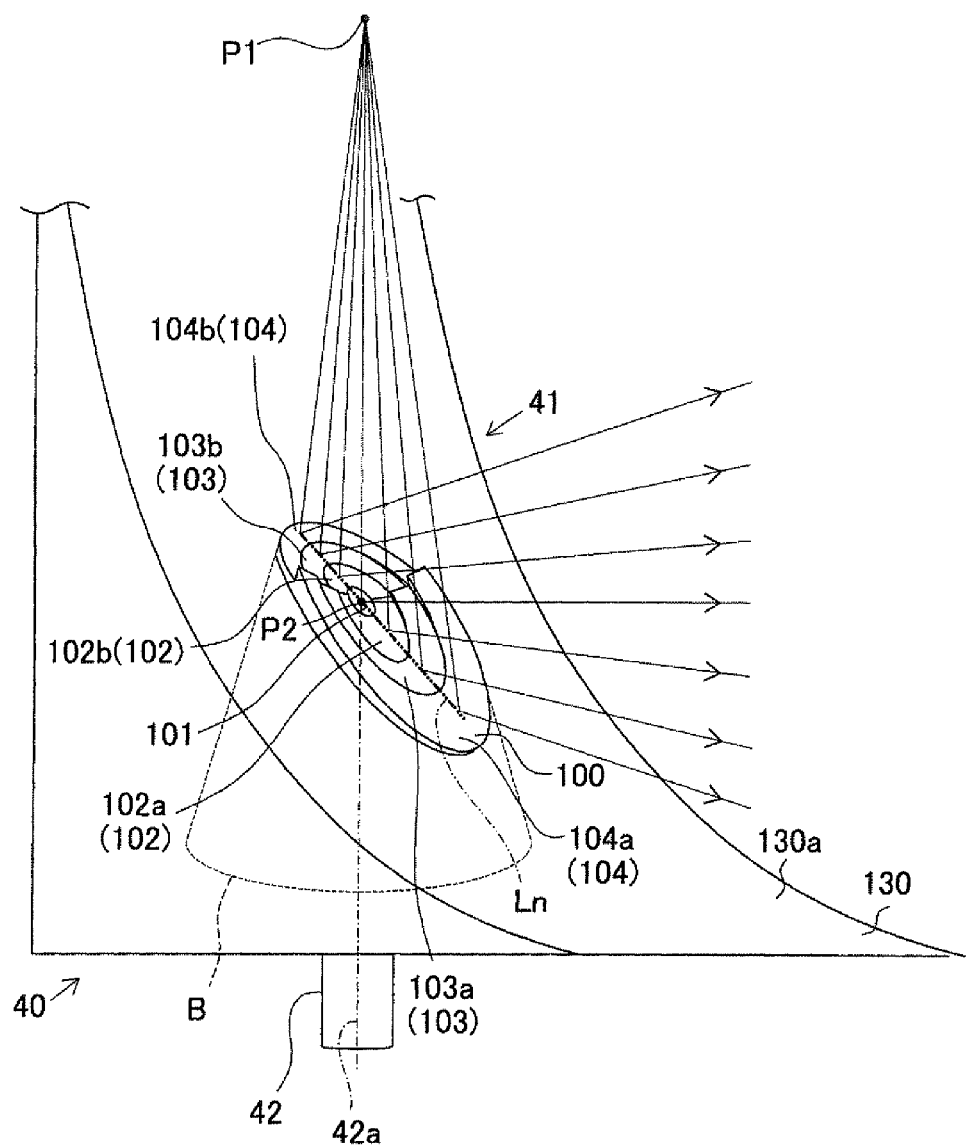
FIG. 3 is a schematic perspective view illustrating the vicinity of a concave mirror of the laser radar illustrated in FIG. 1.

As shown in FIGS. 1 and 3, the concave mirror 130 is located around the deflecting surface 100a of the deflector 41 so as to surround the periphery of an incident region (a region of the scan beam reflector 100). When the laser beam radiated to an external space from the scan beam reflector 100 is reflected by a target present in the external space, the concave mirror 130 functions by collecting the light reflected from the target, while reflecting the reflected light toward the photodiode 20. In FIG. 1, a dash-dot line (refer to reference L2) schematically indicates a path (reflected light guiding path) of the reflected light taken into the laser radar, reflected by the concave mirror 130, and which reaches the photodiode 20.

The shaft 42 is configured integrally with the deflector 41, being rotatably supported by a bearing, not shown, while being ensured to be rotated receiving the driving force of the motor 50.

The motor 50 is made up such as of a known DC motor or a known AC motor. When a driving instruction is received from the control circuit 70, the driving conditions (e.g., rotation timing or rotating speed) of the motor 50 are ensured to be controlled by a motor driver, not shown. Receiving the driving instruction, the motor 50 is ensured to steadily rotate at a predetermined constant rotating speed. The motor 50, in which a rotary drive shaft is integrated into the shaft 42, is configured to steadily rotate the shaft 42 and the deflector 41 about the central axis 42a as a center of rotation.

The laser radar 1 shown in FIG. 1 includes the rotation angle sensor 52 for detecting a rotation angle position of the shaft 42 of the motor 50 (i.e. rotation angle position of the deflector 41). Any sensor, such as a rotary encoder, may be used as the rotation angle sensor 52, provided the sensor is able to detect the rotation angle position of the shaft 42. The rotation angle sensor 52 forms a part of the control means, while the motor 50 configures the driving means.

The laser radar 1 also includes a condenser lens 62 on the reflected-light path extending from the rotating deflection unit 40 to the photodiode 20 to collect and pass reflected light toward the photodiode 20. A filter 64 is interposed between the condenser lens 62 and the photodiode 20. The condenser lens 62 has a function of collecting the light reflected from the concave mirror 130 and guiding the collected reflected light to the photodiode 20. The filter 64 has a function of transmitting the reflected light and removing light other than the reflected light on the light path extending from the rotating deflection unit 40 to the photodiode 20. For example, the filter 64 may be made up of a wavelength selection filter that transmits only the light having a specific wavelength (e.g. light having a wavelength of a predetermined range) corresponding to the reflected light L2, but cuts off light other than this.

In the present embodiment, the concave mirror 130 and the condenser lens 62 correspond to examples of the light collecting means.

The control circuit 70 shown in FIG. 2 is composed of a single or a plurality of control circuits, such as a microcomputer having a CPU. The control circuit 70 is adapted to control the beam-emitting performance of the laser diode 10, the rotating performance of the motor 50 and the driving performance of the actuator 33. The control circuit 70 is connected to the photodiode 20 and the rotation angle sensor 52 and thus is ensured to acquire signals from these components. The control circuit 70 is connected with memories, not shown, such as a ROM, a RAM and a nonvolatile memory, so as to be able to read/write information from/into these memories.

The components described above (laser diode 10, photodiode 20, mirror 31, actuator 33, lens 60, condenser lens 62, filter 64, rotating deflection unit 40, motor 50, rotation angle sensor 52, control circuit 70, etc.) are accommodated in the casing 3 for protection from dust or impact. The casing 3 is provided with a window-type light guide 4 surrounding the deflector 41 to pass the laser beam L1 and the reflected light L2 therethrough. The light guide 4 is annularly shaped centering on the central axis 42a and substantially covering an angle 360° around the central axis. The light guide 4 is provided with a laser-beam transmissive plate 5 made such as of a glass plate. The laser-beam transmissive plate 5 closes the light guide 4 to prevent entry of dust.

Features of the present embodiment are specifically described.

Figure 4A:
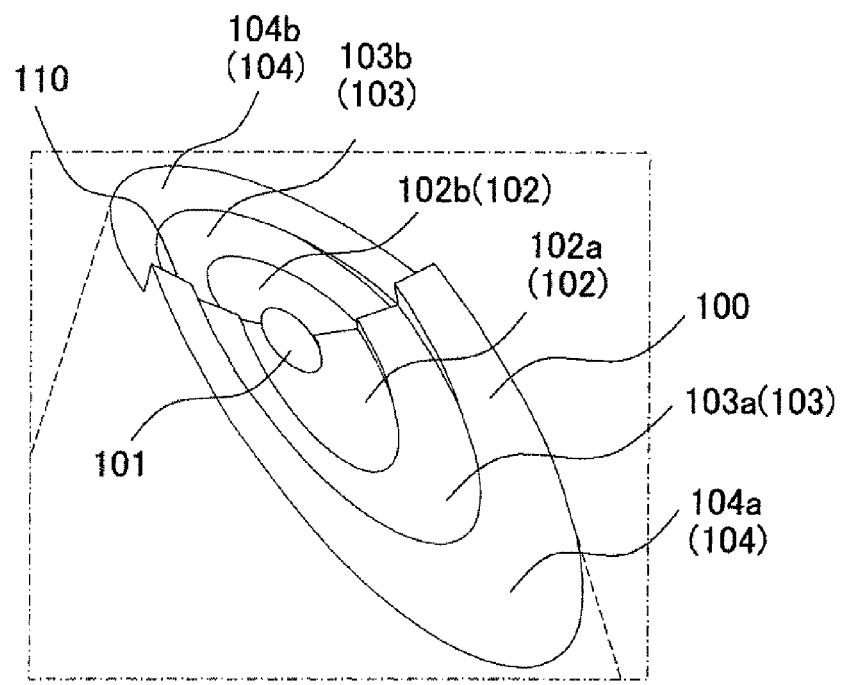
FIG. 4A is a perspective view illustrating a configuration in the vicinity of a scan beam reflector of the laser radar illustrated in FIG. 1.
Figure 4B:
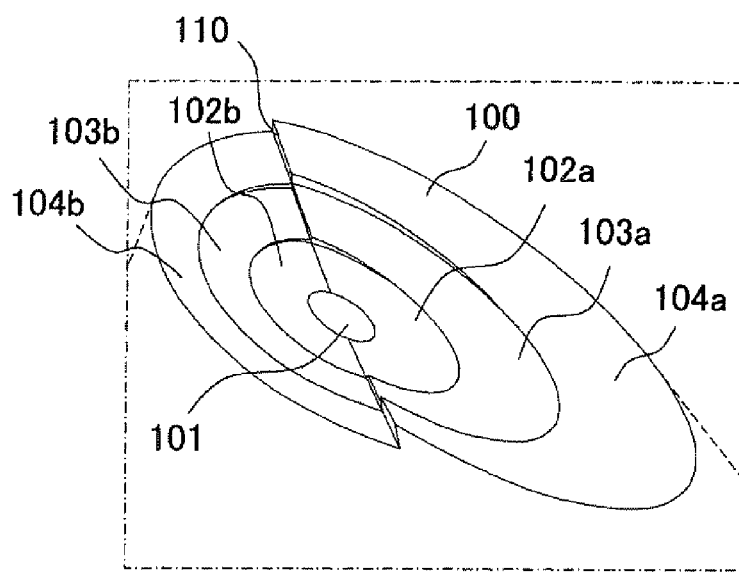
FIG. 4B is a perspective view illustrating the laser radar illustrated in FIG. 4B as viewed from a different direction.

FIG. 3 is a schematic perspective view illustrating the vicinity of the concave mirror 130 of the laser radar 1. FIG. 4A is a perspective view illustrating a configuration in the vicinity of the scan beam reflector 100 of the laser radar 1. FIG. 4B is a perspective view illustrating the laser radar illustrated in FIG. 4B as viewed from a different direction.

Figure 5:
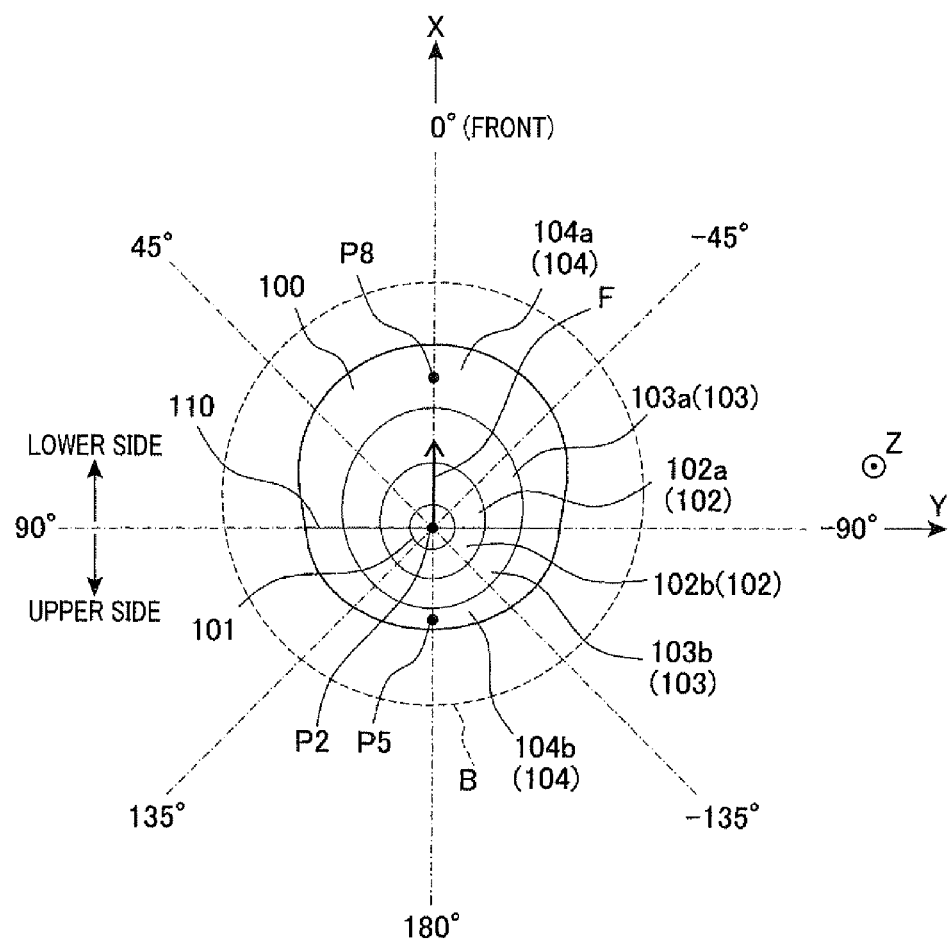
FIG. 5 is a plan view illustrating a configuration in the vicinity of the scan beam reflector of the laser radar illustrated in FIG. 1.
Figure 6A:
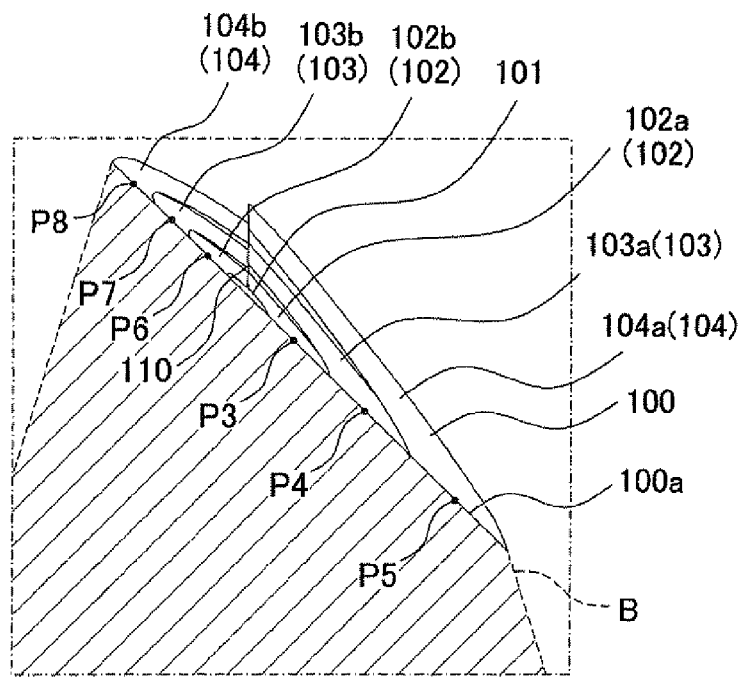
FIG. 6A is a schematic cross-sectional view taken along an azimuth direction of 0° to 180° of FIG. 5.
Figure 6B:
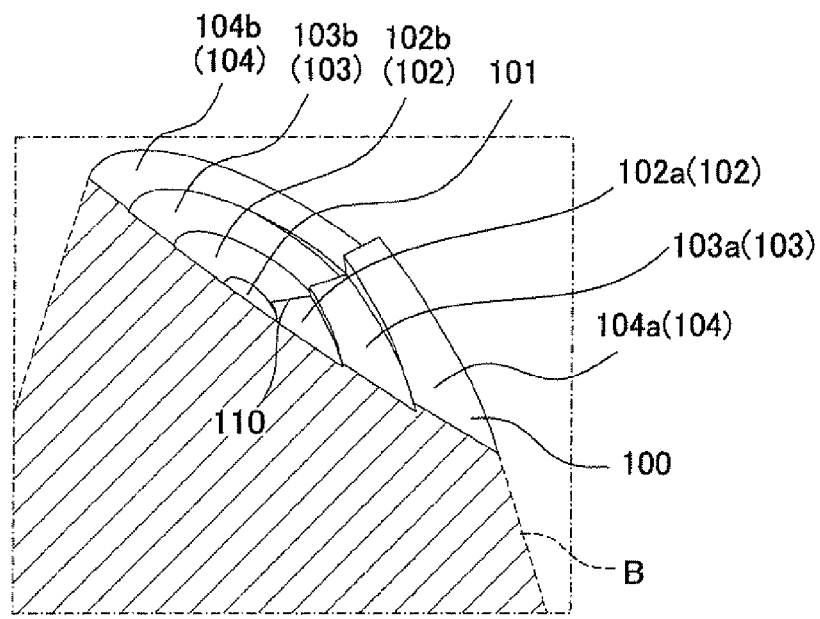
FIG. 6B is a schematic cross-sectional view taken along a direction 45° to −135° of FIG. 5.

FIG. 5 is a plan view illustrating a configuration in the vicinity of the scan beam reflector 100. FIG. 6A is a schematic cross-sectional view taken along an azimuth direction (or simply direction in the horizontal plane) of 0° to 180° of FIG. 5. FIG. 6B is a schematic cross-sectional view taken along an azimuth direction of 45° to −135° of FIG. 5. FIGS. 6A and 6B both show the scan beam reflector 100 as viewed from an azimuth direction of −90°. FIG. 3 and the subsequent figures illustrate the scan beam reflector 100 provided with a seat B embedded in the deflector 41, FIGS. 4A and 4B and the subsequent figures only show the scan beam reflector 100 and the seat B, omitting the concave mirror 130 and the like. The seat B is shown just to clarify the explanation. If the scan beam reflector is arranged so that the reflecting surfaces can be exposed, the seat B is not required to be provided.

As shown in FIGS. 3, 4A, 4B and 6, the deflector 41 has a deflecting region (deflecting surface 100a) which is divided into a reflecting area of the scan beam reflector 100 and a reflecting area (reflecting region 130a) of the concave mirror 130. Of these reflecting areas, the reflecting area of the scan beam reflector 100 includes a plurality of annular or arc-shaped reflecting surfaces 101, 102a, 102b, 103a, 103b, 104a and 104b which are multi-stepped and coaxially arranged surrounding or centering on the central axis 42a. In the present embodiment, the orientation of the deflector 41 is defined by the direction of a horizontal component of the laser beam L1 (see an arrow F of FIG. 5) which is reflected when the laser beam L1 is incident on a position P2 (position where the central axis 42a intersects the reflecting surface 101). This orientation, i.e. the reference direction F in azimuth direction, is fixed in the laser radar 1. The lower reflecting surfaces 102a, 103a and 104a are defined from the upper reflecting surfaces 102b, 103b and 104b by a linear boundary that is produced as a step 110 passing through the position P2 and extending in a direction perpendicular to the orientation of the deflector 41. Specifically, the boundary (step 110) is positioned in a plane including the central axis 42a and perpendicular to the arrow F.

Hence, the vertical deflected range of the laser beam L1 (i.e., the deflection in the X-Y plane direction) is shared by the upper and lower reflecting surfaces divided by the liner boundary.

The reflecting surface 101, corresponding to a central area of the scan beam reflector 100 having the coaxial configuration, is arranged on the central axis 42a, being inclined with respect to the central axis 42a. The reflecting surface 101 is formed covering the whole peripheral region along the circumference, centering on the central axis 42a. Accordingly, as far as the reflecting surface 101 is concerned, the whole peripheral region along the circumference corresponds to the forming region to reflect the laser beam.

The reflecting surfaces 102a and 102b compose a second annular area 102 located immediately outer side of the central area, both being adjacent to the reflecting surface 101 and surrounding the reflecting surface 101. Each of the reflecting surfaces 102a and 102b is provided along approximately a half of the circumference, forming an arc shape. Specifically, each of the reflecting surfaces 102a and 102b has a substantially arc shape with its ends being located along the step 110. Accordingly, each of the reflecting surfaces 102a and 102b is formed in a region covering approximately a half of the circumference around the central axis 42a. As shown in FIG. 3, the scan beam reflector 100 is configured being inclined as a whole, in which one side thereof (located in the direction F that is the orientation of the deflector 41) is provided at a lower position, and the other side thereof (located in the direction opposite to the direction F that is the orientation of the deflector 41) is provided at an upper position. In the second annular area 102, the reflecting surface 102a is located at a level lower than the boundary (step 110), while the reflecting surface 102b is located at a level higher than the boundary (step 110).

The reflecting surfaces 103a and 103b compose a third annular area 103 which is located outside of the central area and the second annular area 102 (i.e. located immediately outside of the second annular area 102). Thus, the reflecting surface 103a is located adjacent to the reflecting surface 102a, while surrounding the reflecting surface 102a at a level lower than the boundary (step 110) and forming an arc shape (semicircular shape). The reflecting surface 103b is located adjacent to the reflecting surface 102b, while surrounding the reflecting surface 102b at a level higher than the boundary (step 110) and forming an arc shape (semicircular shape). Each of the reflecting surfaces 103a and 103b is formed in an arc shape covering approximately a half of the circumference around the central axis 42a.

Accordingly, for each of the reflecting surfaces 103a and 103b covers approximately a half of the circumference.

Further, the reflecting surfaces 104a and 104b compose a fourth annular area 104 which is located outside of the central area and outside the second and third annular areas 102 and 103 (i.e. located immediately outside of the third annular area 103, forming the outermost periphery of the scan beam reflector 100). Thus, the reflecting surface 104a is located adjacent to the reflecting surface 103a, while surrounding the reflecting surface 103a below the boundary (step 110) and forming an arc shape (semicircular shape). The reflecting surface 104b is located adjacent to the reflecting surface 103b, while surrounding the reflecting surface 103b above the boundary (step 110) and forming an arc shape (semicircular shape). Each of the reflecting surfaces 104a and 104b is formed in an arc shape covering approximately a half of the circumference. Accordingly, each of the reflecting surfaces 104a and 104b covers approximately a half of the circumference.

The plurality of reflecting surfaces 101 to 104 configured in this way are ensured to have different inclination statuses with respect to a plane (horizontal plane) perpendicular to the central axis 42a. The inclination statuses can also be expressed as inclinations of tangential lines to the horizontal plane at any points on the respective reflecting surfaces. Specifically, the reflecting surfaces 102a, 102b, 103a, 103b, 104a and 104b are formed into paraboloids (rotary parabolic curved surfaces) having different curvatures, that is, different curvature radiuses. Hence, in the present embodiment, the inclinations (or the inclined states) are defined as curvature radiuses (or curvatures).

As an example, these reflecting surfaces 102a, 102b, 103a, 103b, 104a and 104b are ensured to have smaller curvature radiuses as the surfaces are located closer to the center and a larger curvature radius as the surfaces are located closer to the outer periphery. That is, the third annular area 103 has a curvature radius larger than that of the second annular area 102, and the fourth annular area 104 has a curvature radius larger than that of the third annular area 103.

However, the foregoing example can be changed. A relationship between the positions of the reflecting surfaces in the scan beam reflector 100 and largeness of the curvature radiuses (curvatures) depends on design. Each reflecting surface can be produced as a trajectory made by rotation of parabolic curves to the light beam in consideration of the incident and reflected directions of the laser beam. Hence, the largeness of the foregoing curvature radiuses is only one of exemplary embodiments. There are two factors for deciding the curvatures (or curvature radiuses) of the respective reflecting surfaces. One factor is a focal length of a paraboloidal surface composing each reflecting surface in the reflector 100 and the other is a distance between the focal point and each reflecting surface. The design is made in view of these factors, occasionally resulting in that the curvature radiuses may be smaller as advancing radially outward in the scan beam reflector 100.

More specifically, let us assume a cross section obtained by cutting the scan beam reflector 100 along the direction F, passing through the central axis 42a. The reflecting surfaces are configured such that the outline of each of the reflecting surfaces forms a parabola. FIG. 2 schematically illustrates a geometric correlation in a cross section (see FIG. 6A) obtained by cutting the scan beam reflector 100 along the X-Y plane when the orientation of the deflector 41 (direction F of FIG. 5) coincides, as shown in FIG. 1, with the positive direction of the X axis. In FIG. 2, the deflecting surface (reflecting surfaces) 100a of the scan beam reflector 100, as shown by its outline in the cross section taken along the X-Y plane, has an inclination angle α (inclination angle with respect to the horizontal plane) of 45°.

In FIG. 2, curves of the reflecting surfaces at positions Pm and Pn correspond to the parabolas expressed by the following Formula (1). In Formula (1), t indicates a parameter and L indicates a distance between the positions P1 and P2.

$$\begin{cases} x = \cos\theta \cdot \left( \dfrac{t^2}{2\sqrt{2} \cdot L \cdot \cos(\theta + 45°)} - \dfrac{\sqrt{2} \cdot L \cdot (\theta + 45°)}{2} \right) + t \cdot \sin\theta \\ y = -\sin\theta \cdot \left( \dfrac{t^2}{2\sqrt{2} \cdot L \cdot \cos(\theta + 45°)} - \dfrac{\sqrt{2} \cdot L \cdot (\theta + 45°)}{2} \right) + t \cdot \cos\theta \end{cases} \quad (1)$$

Further, each of the reflecting surfaces (reflecting surfaces including positions Pm and Pn), whose outlines in the cross section taken along the X-Y plane are expressed by the above parabolas, has a paraboloid obtained by rotating the reflecting surface about an axis expressed by the following Formula (2).

$$y = \tan(-\theta) \cdot x \quad (2)$$

In this case, the laser beam L1 at each of the positions Pm and Pn has an inclination angle β as expressed by the following Formula (3) with respect to the horizontal plane.

$$\beta = -\theta \quad (3)$$

The position Pn may be regarded as being a position P3, P4 or P5 (see FIG. 6A) on the X-Y plane (when the direction F coincides with the positive direction of the X axis) in the lower-side reflecting surface 102a, 103a or 104a, respectively. Thus, substituting +θ at each position P3, P4 or P5 into Formula (1) of parabola and Formula (2) of rotational axis, the paraboloid (i.e. the reflecting surface 102a, 103a or 104a) for each position P3, P4 or P5 can be formed. It should be appreciated that the positions P3, P4 and P5 are the centers of width of the respective reflecting surfaces 102a, 103a and 104a.

The position Pm may be regarded as being a position P6, P7 or P8 (see FIG. 6A) on the X-Y plane (when the direction F coincides with the positive direction of the X axis) in the upper-side reflecting surface 102b, 103b or 104b, respectively. Thus, substituting −θ at each position P6, P7 or P8 into Formula (1) of the parabola and Formula (2) of the rotational axis, the paraboloid for each position P6, P7 or P8 (i.e. the reflecting surface 102b, 103b or 104b) can be formed. It should be appreciated that the positions P6, P7 and P8 are the centers of width of the respective reflecting surfaces 102b, 103b or 104b.

In the present embodiment, an azimuth range covering 180°, i.e. from −90° to +90° of FIG. 5, is the scan range for a predetermined azimuth direction of 180°. The scan range in this azimuth direction is fixed for the laser radar 1. Depending on the position where the step 110 is formed, the scan range in this azimuth direction may be made smaller than 180°.

Hereinafter is described a basic operation in the processing of target detection (monitoring) performed by the laser radar 1.

Figure 7A:
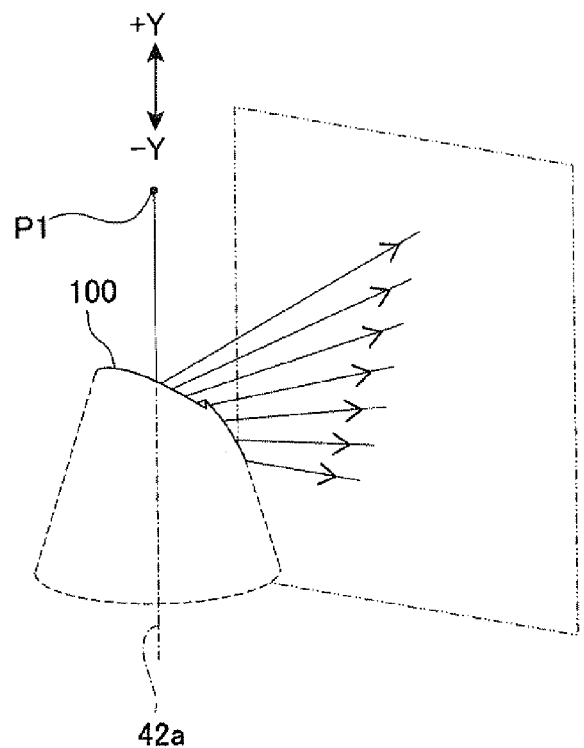
FIG. 7A is a schematic perspective view illustrating laser beam radiation performed by the scan beam reflector oriented to an azimuth direction of −45°.
Figure 7B:
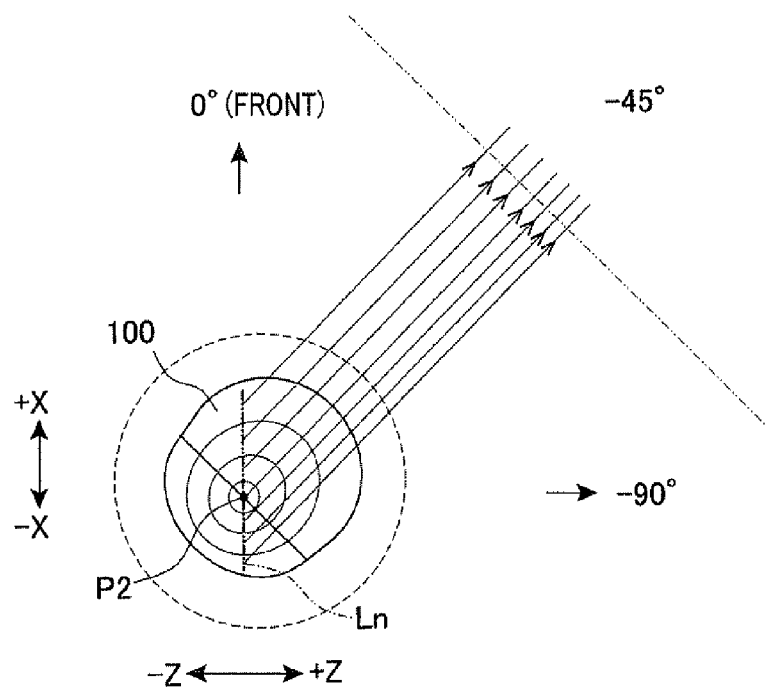
FIG. 7B is a plan view of the scan beam reflector illustrated in FIG. 7A.
Figure 8:
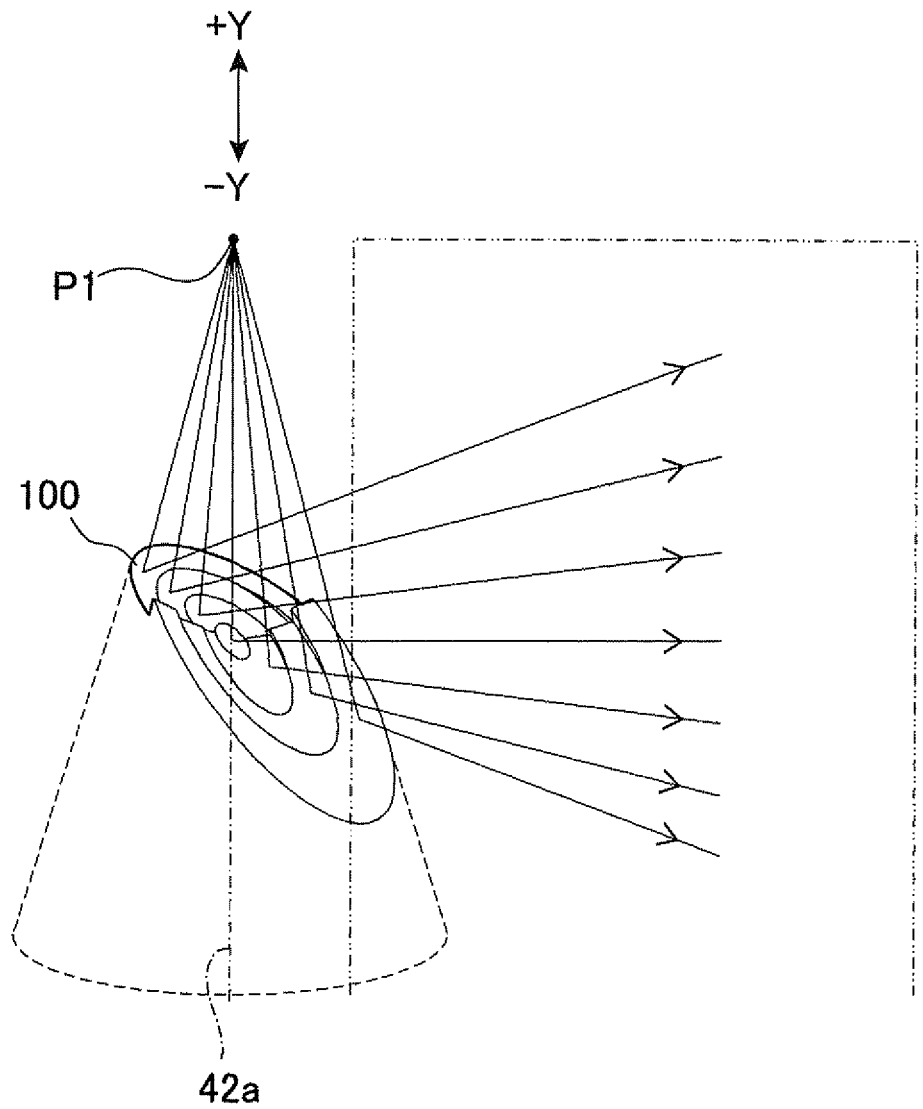
FIG. 8 is a perspective view of the scan beam reflector which is oriented to an azimuth direction of −45°, as viewed from a direction different from the direction of FIG. 7A.

FIG. 7A is a schematic perspective view illustrating laser beam radiation performed by the scan beam reflector 100 oriented to an azimuth direction of −45° (i.e. the deflector is oriented to a direction) −45°, as viewed from an azimuth direction of 180° of FIG. 5. FIG. 7B is a plan view of the scan beam reflector 100 illustrated in FIG. 7A. FIG. 8 is a perspective view of the scan beam reflector 100 which is oriented to an azimuth direction of −45°, as viewed from a direction (from an azimuth direction of −90° of FIG. 5) different from the direction of FIG. 7A.

Figure 9A:
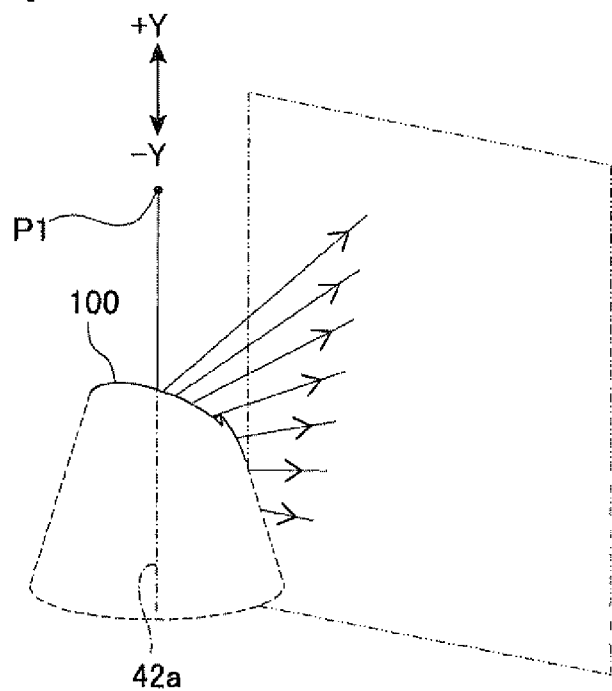
FIGS. 9A and 9B are schematic perspective views illustrating laser beam radiation performed by the scan beam reflector oriented to azimuth directions of −30° and −15°, respectively.
Figure 9B:
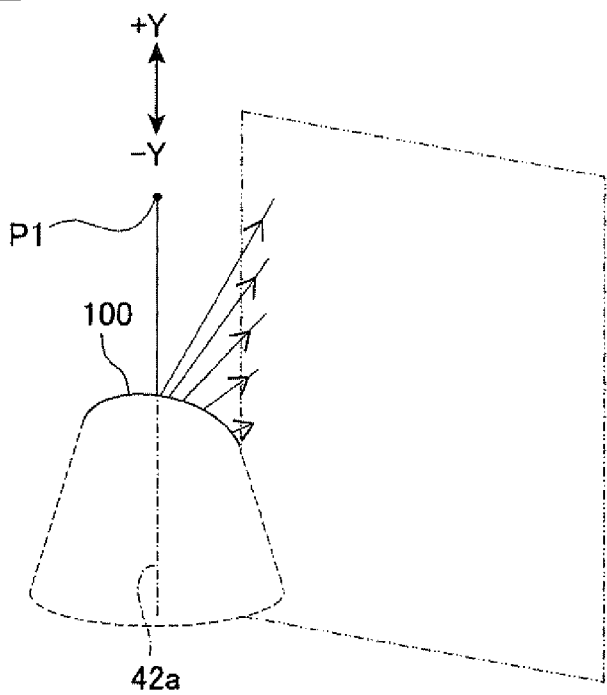
Figure 10A:
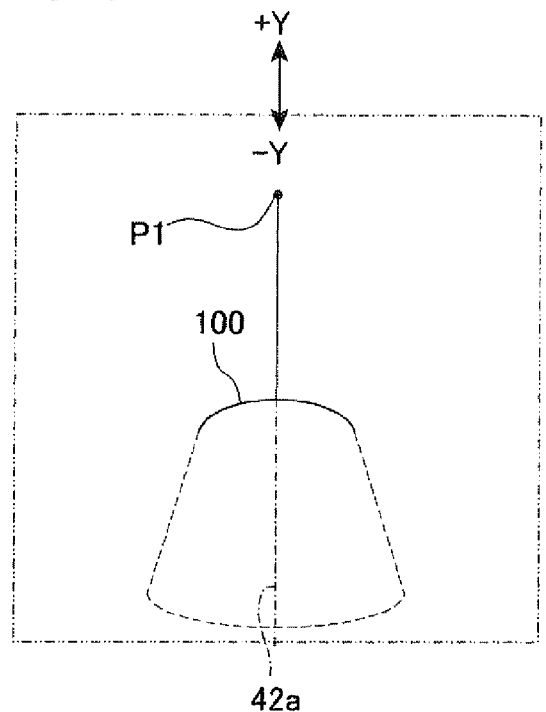
FIG. 10A is a schematic perspective view illustrating laser beam radiation performed by the scan beam reflector oriented to a direction 0°.
Figure 10B:
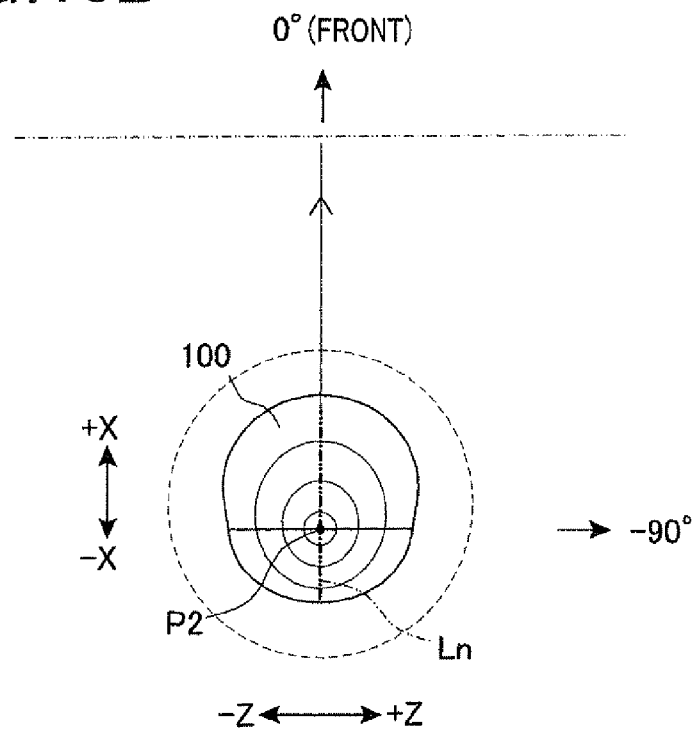
FIG. 10B is a plan view of the scan beam reflector illustrated in FIG. 10A.
Figure 11:
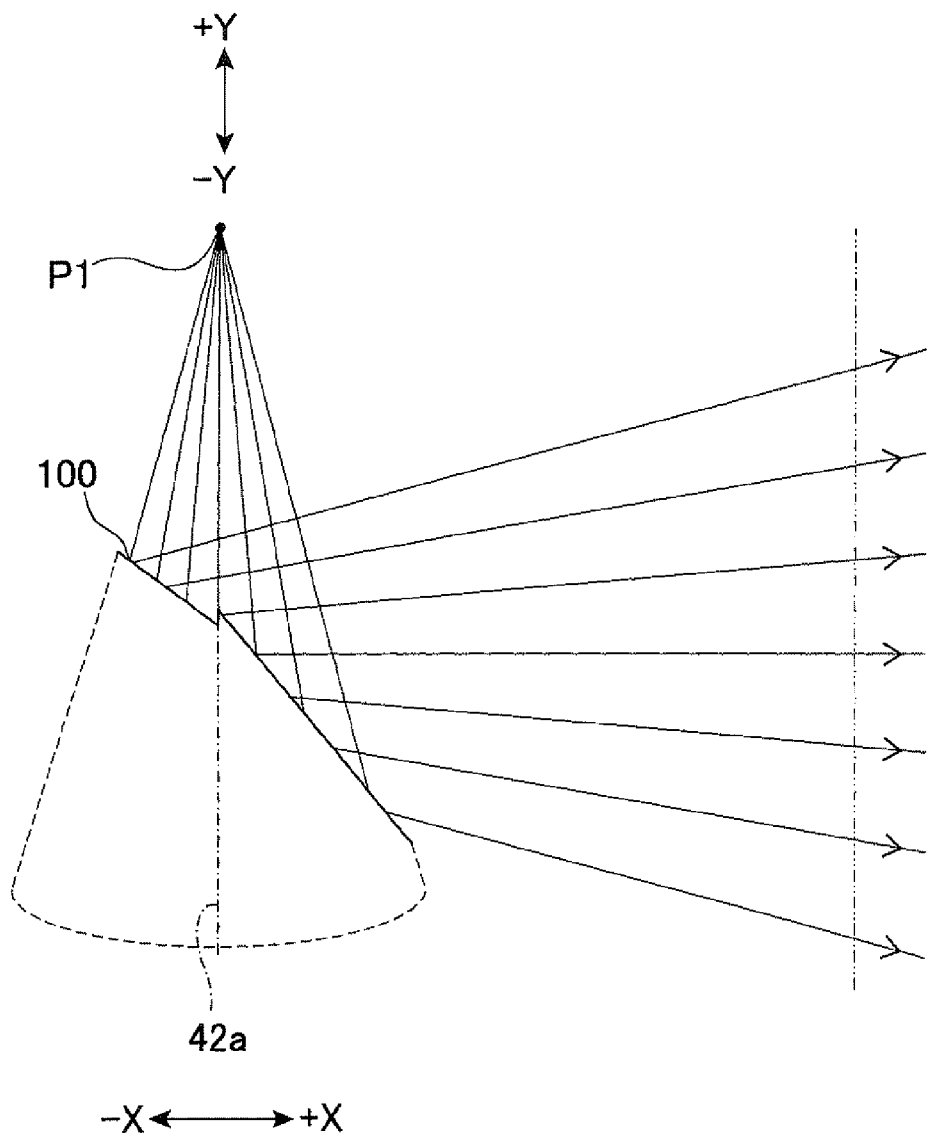
FIG. 11 is a diagram illustrating laser beam radiation performed by the scan beam reflector oriented to an azimuth direction of 0°, as viewed from a direction different from the direction in FIG. 10A.

FIGS. 9A and 9B are schematic perspective views illustrating laser beam radiation performed by the scan beam reflector 100 oriented to azimuth directions of −30° and −15°, respectively. FIG. 10A is a schematic perspective view illustrating laser beam radiation performed by the scan beam reflector 100 oriented to an azimuth direction of 0°, as viewed from an azimuth direction of 180° of FIG. 5. FIG. 10B is a plan view of the scan beam reflector 100 illustrated in FIG. 10A. FIG. 11 is a diagram illustrating laser beam radiation performed by the scan beam reflector 100 oriented to an azimuth direction of 0°, as viewed from a direction (from an azimuth direction of −90° of FIG. 5) different from the direction in FIG. 10A.

Figure 12A:
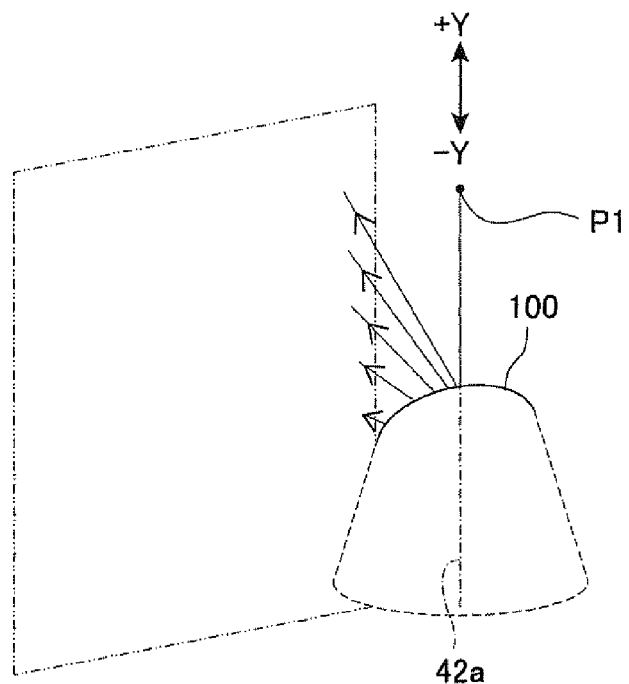
FIGS. 12A and 12B are schematic perspective views illustrating laser beam radiation performed by the scan beam reflector oriented to azimuth directions of 15° and 30°, respectively.
Figure 12B:
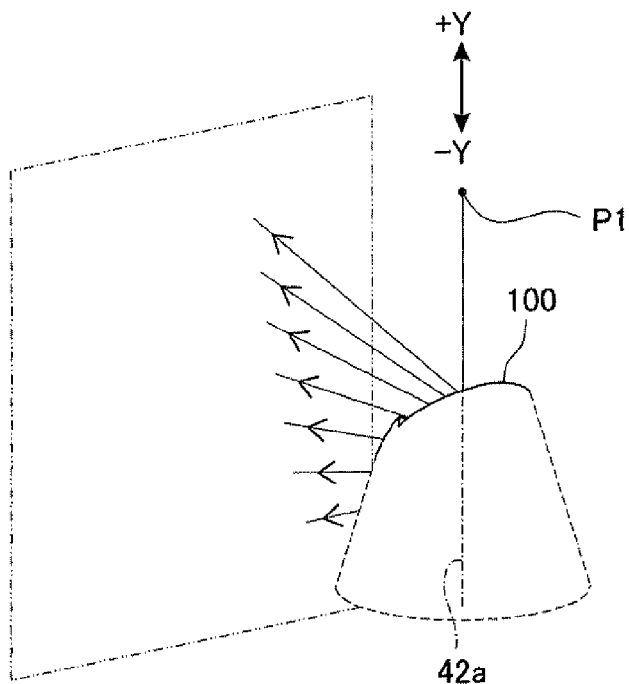
Figure 13A:
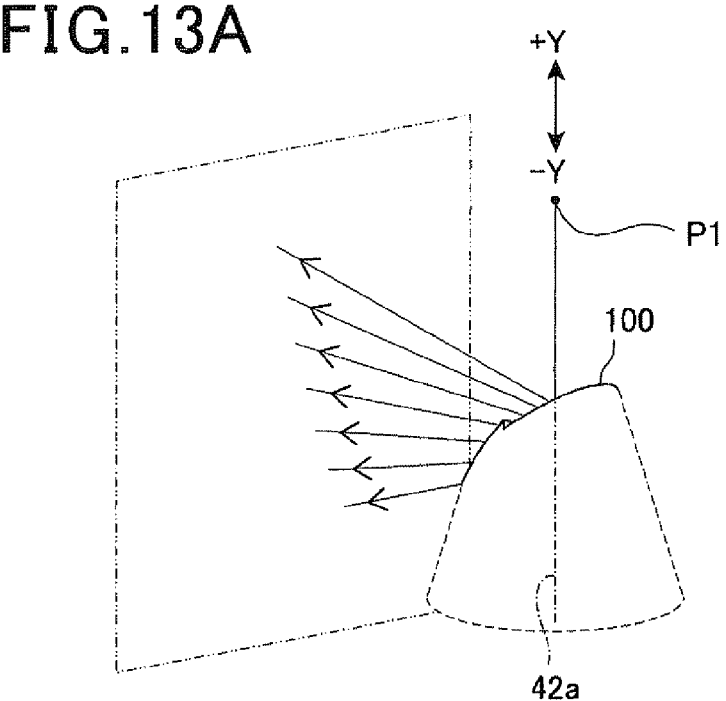
FIG. 13A is a schematic perspective view illustrating laser beam radiation performed by the scan beam reflector oriented to a direction 45°.
Figure 13B:
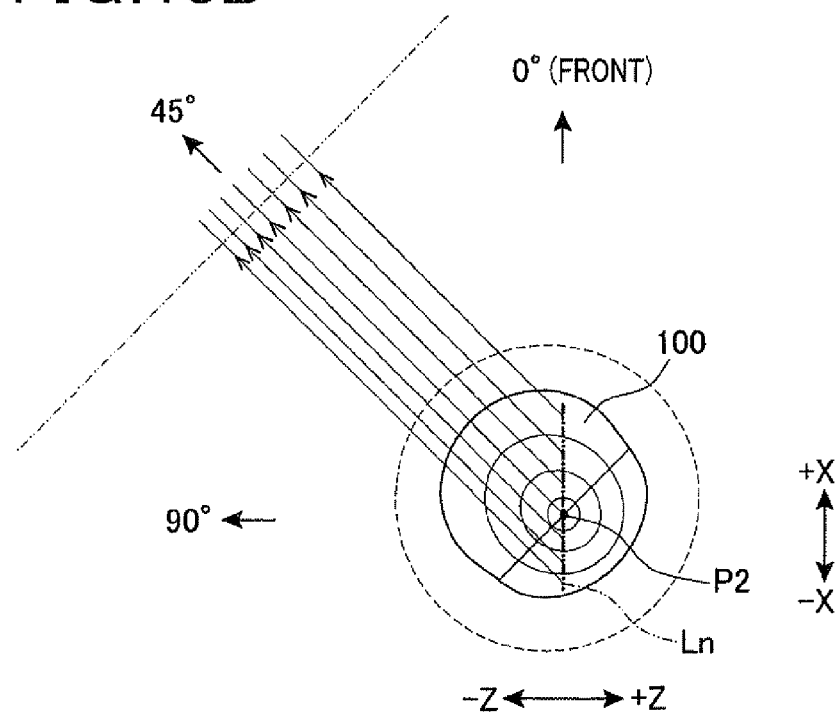
FIG. 13B is a plan view of the scan beam reflector illustrated in FIG. 13A.
Figure 14:
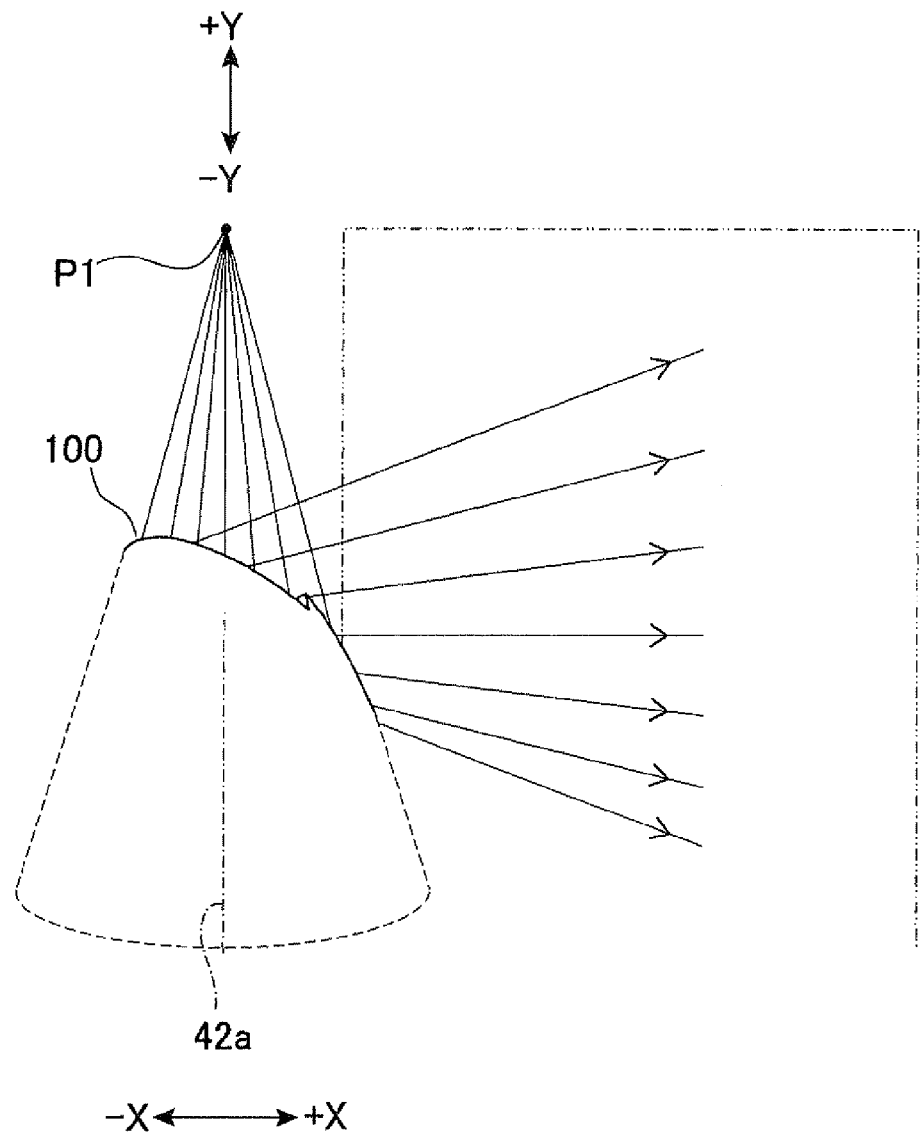
FIG. 14 is a perspective view illustrating laser beam radiation performed by the scan beam reflector oriented to an azimuth direction of 45°, as viewed from a direction different from the direction in FIG. 13A.

FIGS. 12A and 12B are schematic perspective views illustrating laser beam radiation performed by the scan beam reflector 100 oriented to azimuth directions of 15° and 30°, respectively. FIG. 13A is a schematic perspective view illustrating laser beam radiation performed by the scan beam reflector 100 oriented to an azimuth direction of 45°, as viewed from an azimuth direction of 180° of FIG. 5. FIG. 13B is a plan view of the scan beam reflector 100 illustrated in FIG. 13A. FIG. 14 is a perspective view illustrating laser beam radiation performed by the scan beam reflector 100 oriented to an azimuth direction of 45°, as viewed from a direction (from an azimuth direction of −90° of FIG. 5) different from the direction in FIG. 13A. In FIGS. 7A, 7B, 8, 9A, 9B, 10A, 10B, 11, 12A, 12B, 13A, 13B and 14, a virtual plane as a target of radiation is schematically indicated by a two-dot-dash line on a side to which the deflector is oriented (on a side to which a laser beam is radiated from the deflector).

In the laser radar 1 shown in FIG. 1, the deflector 41 is adapted to rotate at a fixed speed by the driving force of the motor 50. FIGS. 7A to 14 show the rotation of the deflector 41. In FIGS. 7A, 7B and 8, the azimuth direction of the deflector 41 (direction F of FIG. 5) corresponds to −45°. In FIG. 9A, the orientation is −30°. In FIG. 9B, the orientation is −15°. In FIGS. 10A, 10B and 11, the orientation is 0°. In FIG. 12A, the orientation is 15°. In FIG. 12B, the orientation is 30°. In FIGS. 13A, 13B and 14, the orientation is 45°. Each of these angles corresponds to a rotation angle with respect to a reference azimuth direction. The positive direction of the X axis corresponds to a reference direction (reference angle 0°).

In the laser radar 1, the actuator 33 is driven and controlled by the control circuit 70 shown in FIG. 2 to pivotally move the mirror 31. Thus, the laser beam L1 directed from the mirror 31 to the deflector 41 is scanned so as to move within the virtual plane. The virtual plane corresponds to a plane including the path of the laser beam L1 from the collimating lens 60 toward the mirror 31 and including the central axis 42a. In FIG. 1, for example, the virtual plane corresponds to the X-Y plane including the position P1 as an origin. The laser beam L1 moves within the virtual plane with the pivotal movement of the mirror 31. Thus, line scan is conducted onto the scan beam reflector 100 which is arranged intersecting the virtual plane.

Reference Ln in FIG. 7B indicates a line scan position in the scan beam reflector 100. As can be seen from FIG. 7B, the line scan position draws a linear line (linear line within a predetermined range), in a plan view. In the laser radar 1, the scan range (the range the laser beam from the mirror 31 can move within the virtual plane) of the mirror 31 is fixed in the X-Y-Z coordinate system. Accordingly, when the deflector 41 is rotated as shown by FIGS. 7B, 10B and 13B, the line scan position Ln relatively moves on the plurality of reflecting surfaces 101 to 104 according to the rotation of the deflector 41.

In the process of the relative movement of the line scan position Ln, the line scan position is ensured to move crossing over the plurality of reflecting surfaces 101, 102a, 102b, 103a, 103b, 104a and 104b, at whichever position the deflector 41 may be located. In other words, in the positional relationship of the laser radar 1, the laser beam L1 is incident on all of the plurality of reflecting surfaces, at whichever position the deflector 41 may be located. Accordingly, when the orientation of the deflector 41 is changed through its sequential rotation as shown in FIGS. 7A, 9A, 9B, 10A, 12A, 12B and 13A, the laser beam L1 is reflected by all of the reflecting surfaces by controlling the mirror 31. Thus, the laser beam L1 is radiated to the directions corresponding to the respective reflecting surfaces.

In the present embodiment, the control circuit 70 and the actuator 33 corresponding to the control means have a function of controlling the angle (displacement) of the mirror 31. Specifically, the control circuit 70 and the actuator 33 control the angle (displacement) of the mirror 31 so that the laser beam L1 moving within the virtual plane is incident only on a region of the scan beam reflector 100. More specifically, the control circuit 70 and the actuator 33 determine the range of changing the angle of the mirror 31 and the parabolic curved surface (curvature) of the reflecting surfaces 101 to 104, so that the line scan position Ln shown in FIG. 7B, for example, will not go out of the scan beam reflector 100 and will not enter the concave mirror 130. Alternatively to this, the angle of the mirror 31 may be controlled point by point according to the rotation angle of the deflector 41, so that the linear scan range Ln accompanying the angle change of the mirror 31 will not go out of the region of the scan beam reflector 100.

In the laser radar 1 configured as described above, pulsed current is supplied to the laser diode 10 during the rotation of the deflector 41. Then, a pulsed laser beam (laser beam L1), which is pulsed at a time interval suitable for the timing and pulse width of the pulsed current, is outputted from the laser diode 10. The laser beam L1 is emitted as non-parallel light and passed through the lens 60 for conversion into parallel light rays. After passing through the lens 60, the laser beam L1 is reflected by the mirror 31, further reflected by the scan beam reflector 100, and radiated into an external space.

When the laser beam L1 radiated from the scan beam reflector 100 hits a target (target of detection) present in an external space, the laser beam L1 is reflected back by the target toward the laser radar 1. A part of the reflected light (light L2) enters the casing 3 via the laser-beam transmissive plate 5 and falls on the concave mirror 130. The concave mirror 130 guides (reflects) the light L2 toward the photodiode 20, followed by collection by the condenser lens 62. The collected light L2 transmits through the filter 64 and enters the photodiode 20. Upon reception of the light L2, the photodiode 20 outputs an electrical signal (light-receiving signal) according to the intensity of the light L2 (e.g., outputs a voltage according to the received light L2).

The control circuit 70 measures a time T from the emission to the reception of the laser beam L1. In other words, the control circuit 70 measures the time from when the laser diode 10 outputs the pulsed laser beam L1 until when the photodiode 20 receives the reflected light L2 corresponding to the pulsed laser beam L1. The measurement of the time T is performed based on the timing when a pulsed signal is transmitted to the laser diode 10 and the timing when the photodiode 20 outputs the light-receiving signal. Further, the control circuit 70 calculates a distance L from a reference position (e.g., position P2) in the laser radar 1 to a target based on the time T and the well-known light speed c.

The azimuth of a detected target can be calculated based on the angle of the mirror 31 when the laser beam L1 is radiated from the laser diode 10, and the orientation (direction F) of the deflector 41.

The control circuit 70 is able to obtain an output from the rotation angle sensor 52 at the time when the pulsed laser beam L1 is radiated. The output corresponds to a rotational displacement θ from the reference azimuth angle of the deflector 41 at the timing when the pulsed laser beam 1 is radiated. Further, the control circuit 70, which controls the amount of displacement of the actuator 33, is able to obtain the angle (displacement) of the mirror 31 when the pulsed laser beam L1 is radiated (i.e. able to obtain the angle θ shown in FIG. 2). Thus, the control circuit 70 is able to obtain on which of the reflecting surfaces 101, 102a, 102b, 103a, 103b, 104a and 104b the laser beam L1 is incident. When a reflecting surface on which the laser beam L1 is incident is determined, the inclination angle of the laser beam L1 (inclination angle of the laser beam L1 with respect to the horizontal direction) of the reflecting surface is determined. Accordingly, an inclination angle is determined for each of the reflecting surfaces. Thus, the azimuth of the target can be detected based on this inclination angle and the rotational displacement θ mentioned above.

FIGS. 7A to 14 each schematically illustrate a radiation path when the laser beam L1 is incident on the reflecting surfaces 101, 102a, 102b, 103a, 103b, 104a and 104b at the respective rotational positions of the deflector 41. However, the degree of the speed of line scan at the line scan position Ln may be variously set.

For example, the orientation of the mirror 31 may be changed every time the deflector 41 rotates N times (N is a natural number). Thus, incident areas in the respective plurality of reflecting surfaces are shifted at every N number of rotations. This method corresponds to a so-called raster scan. For example, as shown in FIG. 3, the angle of the laser beam L1 from the mirror 31 may be changed in seven stages. In this case, the angle may be changed at every one rotation of the deflector 41 so that when seven rotations are completed, one cycle of seven-stage angle change is completed.

Figure 29:
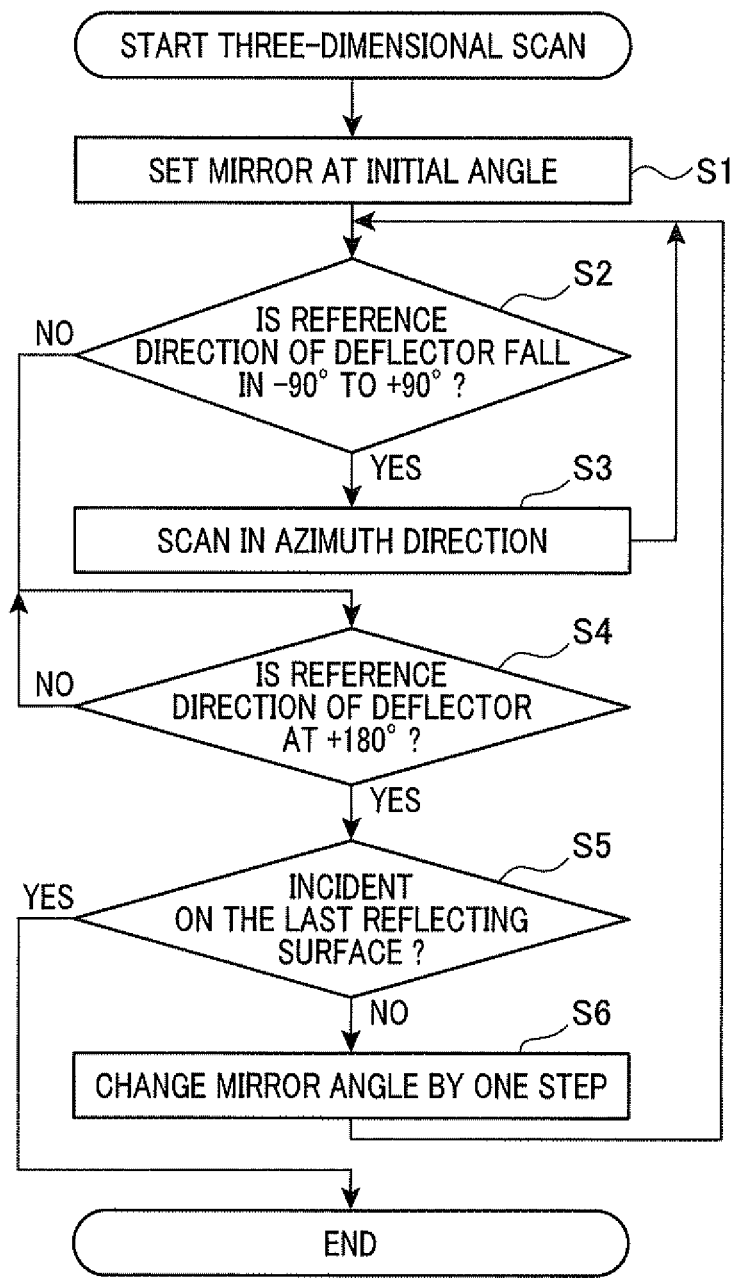
FIG. 29 is a flow diagram illustrating an outline of a control flow performed by a control circuit in order to carry out raster scanning, according to the first embodiment.

FIG. 29 shows a specific example of a control flow of the raster scan. The control flow shown in FIG. 29 is executed by the control circuit 70. The control flow is provided assuming that the motor 50 has already been driven and rotated at a fixed speed.

Upon start of three-dimensional scanning, the control circuit 70 controls the actuator 33 to control the mirror 31 so as to be positioned at its initial angle (step S1). The initial angle corresponds, for example, to an angle at which the laser beam L1 is radiated to the outermost annular reflecting surface 104a shown in FIG. 3. This radiation position is substantially the center in the width direction of the reflecting surface 104a.

Then, the control circuit 70 determines whether or not the reference direction F of the deflector 41 falls in the predetermined azimuth range of −90° to +90° (see FIG. 5) (step S2). This determination is made based on a signal from the rotation angle sensor 52. If the determination is YES, the control circuit 70 commands the drive circuit 9 to have the laser diode 10 radiate a pulsed laser beam L1 at regular intervals (step S3). Thus, the laser beam L1 is radiated into the external space at regular intervals so as to be radiated to the outermost reflecting surface 104*a* to start from. Since the deflector 41 is rotated at a fixed speed, the laser beam L1 radiated into the external space is shifted as well in an azimuth direction on a fixed-angle basis to perform sequential scan. In other words, an azimuth (horizontal) direction scan is performed. The processing of steps S2 and S3 is continued while the reference direction F of the deflector 41 falls in the predetermined azimuth range of −90° to +90°. Thus, a one-line-lower scan is performed in the peripheral space covering the azimuth range of −90° to +90°.

After finishing the lower-one-line scan, a NO determination is made at step S2. In this case, the process waits by until the reference direction F of the deflector 41 is directed to an azimuth direction of +180° (see FIG. 5) (step S4). This determination triggers the mirror 31 to be oriented in advance to the subsequent angle.

If the determination at step S4 is YES, it means that the reference direction F of the deflector 41 coincides with the azimuth direction of 180°. In this case, the control circuit 70 determines whether or not the mirror 31 has already been positioned at an angle allowing the laser beam L1 to be incident on the outermost and last annular reflecting surface 104*b* shown in FIG. 3 (step S5).

If the determination at step S5 is YES, it means that scan of all of the seven lines has been completed in the predetermined azimuth range of 180°. Thus, the control ends. On the other hand, if the determination at step S5 is NO, it means that there still remain lines to be scanned. Accordingly, the control unit 70 controls the actuator 33 to change the angle of the mirror 31 by one step so that the laser beam L1 is radiated to a reflecting surface (e.g., 103*b*) which is located one step higher: (nearer to the center) than the reflecting surface to which the laser beam L1 has been radiated up to then (step S6). Then, control returns to step S2 described above.

In this way, while the deflector 41 is rotated at a fixed speed, the seven lines in the predetermined azimuth range of 180° (−90° to)+90° are sequentially scanned. With this raster scan, three-dimensional scan is performed covering the azimuth range of 180° that is an azimuth direction from −90° to +90° in the external space around the laser radar 1.

In the control described above, the angle of the mirror is changed at every one rotation of the deflector 41. Alternative to this, the angle of the mirror may be changed every time the deflector 41 rotates N number of times (here, N=2, 3, . . . ). In this case, since the rotation angle sensor 52 outputs information indicating the number of rotations of the deflector 41, the control circuit 70 measures the number of rotations of the deflector 41 based on the information. The control circuit 70 uses the information on the number of rotations to monitor the number of rotations N of the deflector 41. Thus, the control circuit 70 performs three-dimensional control as described above.

According to the laser radar 1 of the present embodiment, the deflector 41 has a multi-stepped deflecting surface (a plurality of reflecting surfaces 101, 102*a*, 102*b*, 103*a*, 103*b*, 104*a* and 104*b*) having a coaxial configuration and arranged centering on the central axis 42*a*. In the laser radar 1, the laser beam L1 radiated on positions in the deflecting surface based on line scan. Accordingly, light can be reflected in different directions (i.e. light is radiated into an external space) from the individual reflecting surfaces 101, 102*a*, 102*b*, 103*a*, 103*b*, 104*a* and 104*b* having different inclinations.

Further, in the process of the relative movement of the line scan position Ln across the deflecting surface, the laser beam L1 to be moved in and along the virtual plane is ensured to be incident on the plurality of reflecting surfaces. Accordingly, in spite of the change of orientation of the deflecting surface due to the rotation of the deflector 41, the laser beam L1 is reflected by the individual reflecting surfaces. Thus, the laser beam L1 is scanned toward the space around the laser radar 1, changing its inclination angle (angle with respect to the horizontal plane). In the present embodiment, the scan range in the direction along the X-Z plane (horizontal plane) corresponds to an azimuth range of 180° or less, due to the structure of the scan beam reflector 100. However, the three-dimensional scanning may be performed according to the rotation range of the deflector 41. In particular, the laser beam L1 may be three-dimensionally radiated onto the deflecting surface (reflecting surfaces) based on line scan (one-dimensional scan). Thus, high-speed laser scanning is conducted to the deflecting surface without increasing the size of the drive mechanism or complicating the drive mechanism. Further, a target which is present around the laser radar 1 is three-dimensionally recognized at higher speed.

In the laser radar 1, the surfaces for reflecting line scan beam are formed covering all the peripheral range of the scan beam reflector 100 centering on the central axis 42*a*. With this configuration, the laser beam is ensured to be radiated to the individual reflecting surfaces whichever direction the deflector 41 may be oriented to in the azimuth range of 180° or less on a horizontal plane. Thus, targets present in the horizontal azimuth range of 180° or less around the laser radar 1 can be three-dimensionally recognized reliably.

In the present embodiment, the horizontal scan range is in an azimuth range of 180° at the maximum. However, accordingly, the size of the scan beam reflector 100 and further the size of the concave mirror 130 of the deflector 41 can be reduced.

Further, in the laser radar 1, the orientation of the mirror 31 is changed by the control circuit 70 every time the deflector 41 rotates N times (N is a natural number). Thus, the incident areas in the respective plurality of reflecting surfaces are ensured to be shifted at every N number of rotations.

With this configuration, the orientation of the mirror 31 only has to be changed on an N-time rotation basis. Thus, the load imposed in changing the orientation of the mirror 31 is reduced, compared to the configuration in which the angle of the mirror is changed several times during one rotation of the deflector 41. In particular, in the configuration of changing the angle of the mirror several times in one rotation, it is difficult to rotate the deflector 41 at high speed because the time taken for changing the angle several times has to be taken into account. However, the change of the angle on an N-time rotation basis as described above enables high-speed rotation of the deflector 41, while facilitating the change at appropriate timing without delay. Thus, the laser radar 1 is more advantageously used in conducting high-speed three-dimensional recognition of a target.

In addition, while the laser beam is incident on the individual reflecting surfaces, a fixed inclination angle of the laser beam with respect to the horizontal plane (angle with respect to each reflecting surface on which the laser beam is incident) is maintained when the laser beam is radiated into the external space, in spite of the rotation of the deflector 41. Accordingly, when the reflecting surfaces are shifted subsequently, the fixed inclination angle of the laser beam with respect to the horizontal plane is maintained when the laser beam is radiated into the external space, in spite of the rotation of the deflector 41, as far as the laser beam is incident on the reflecting surfaces.

Furthermore, in the laser radar 1, the control circuit 70 (control means) controls the angle (displacement) of the mirror 31 in such a way that the laser beam to be moved on the virtual plane is incident on only a region in the scan beam reflector 100 (an incident region including the range in which the reflecting surfaces 101 to 104 are formed). Also, the deflector 41 on the side of the deflecting surface surrounding the incident region is formed to serve as the concave mirror 130. Thus, the light reflected by a target is ensured to be collected by the concave mirror 130 and guided to the photodiode 20 (light detecting means).

With this configuration, a region where a plurality of reflecting surfaces are formed in the deflector 41 can be used as an incident region in conducting laser beam radiation. Also, the peripheral area of the incident region can be used as the concave mirror 130 for collecting and guiding the external reflected light (light reflected from a target). Thus, the laser radar 1 contributes to the simplification of the configuration and reduction of the number of components, while using a structure characteristic of performing three-dimensional recognition of a target.

(Modification of the First Embodiment)

The first embodiment has exemplified a method corresponding to the raster scan. However, the scan method is not limited to the one in the first embodiment.

Specifically, in the first embodiment, the angle of the mirror 31 is controlled so that the direction of the laser beam L1 from the mirror 31 is changed in a range from a first direction (the angle that maximizes the inclination (+θ of FIG. 2) with respect to the central axis 42*a*) to a second direction (the angle that minimizes the inclination (−θ of FIG. 2) with respect to the central axis 42*a*) on the virtual plane. Alternatively, however, the mirror 31 may be pivotally moved such that the laser beam scan from the first to second directions is repeated several times during one rotation of the deflector 41.

This configuration enables several-time change of the inclination angle (the angle with respect to the horizontal plane) of the laser beam radiated into the external space while the deflector 41 rotates once.

This configuration is advantageous when Lissajous scan is desired to be conducted.

(Second Embodiment)

Referring now to FIGS. 15 to 28 and FIG. 30, hereinafter is described a second embodiment of the present invention.

Figure 15:
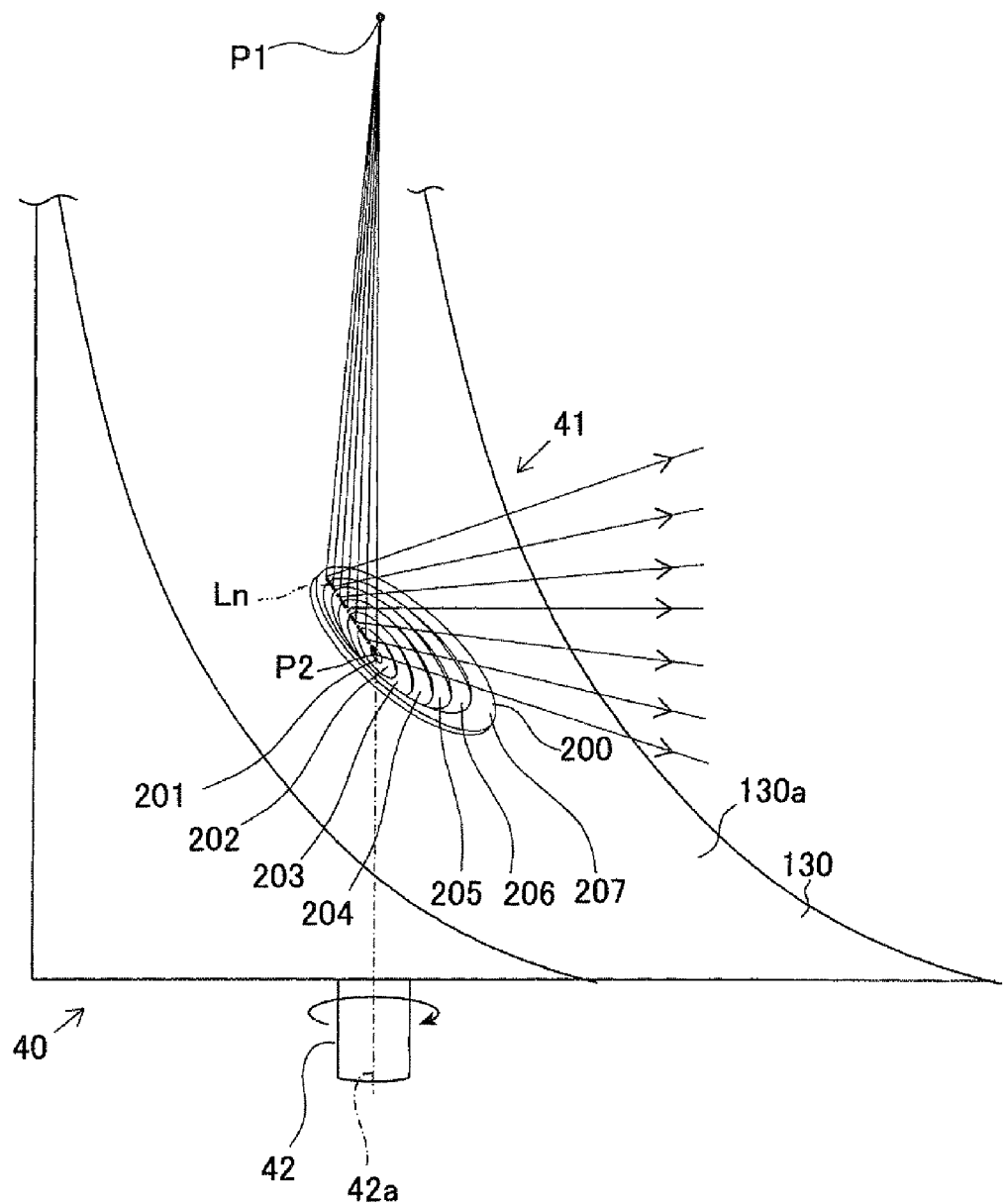
FIG. 15 is a schematic perspective view illustrating the vicinity of a concave mirror of a laser radar according to a second embodiment of the present invention.
Figure 16:
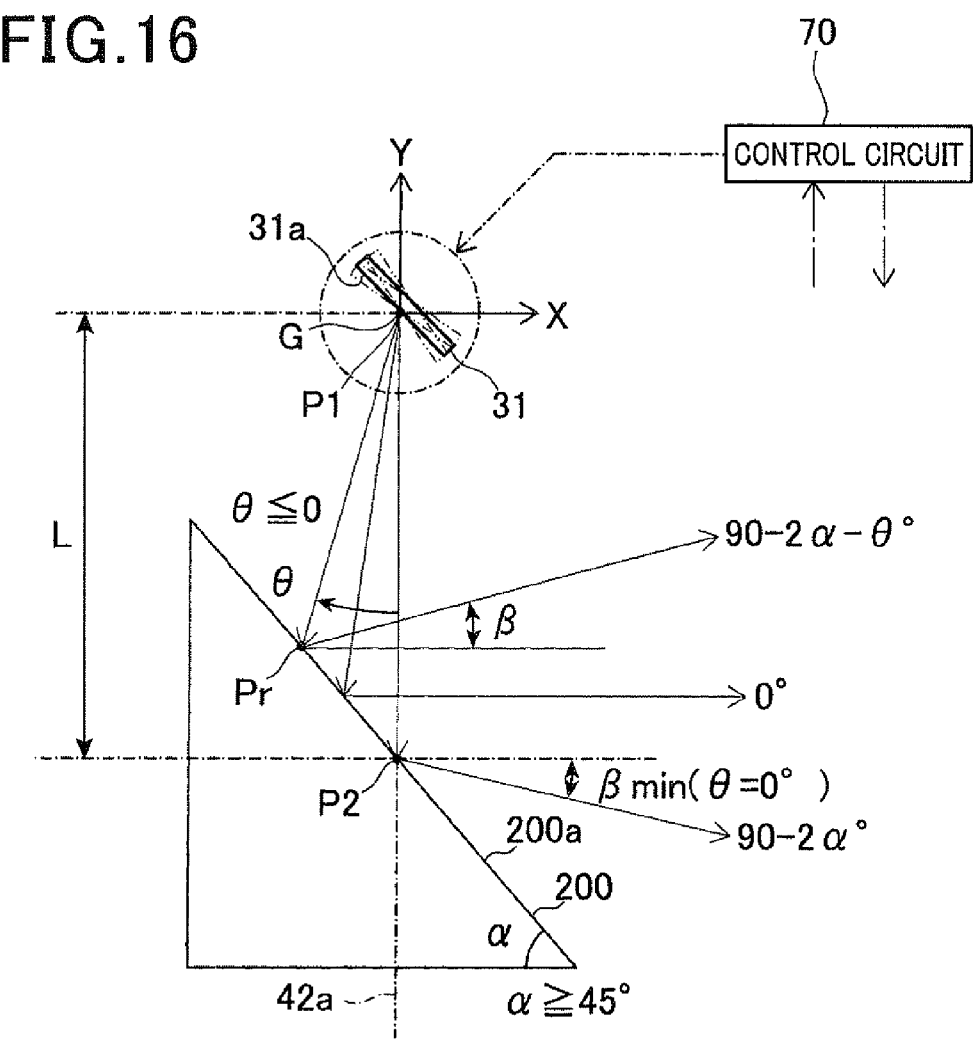
FIG. 16 is a diagram illustrating a correlation between angle of laser beam radiated to a deflector and radiation angle from the deflector, according to the second embodiment.
Figure 17:
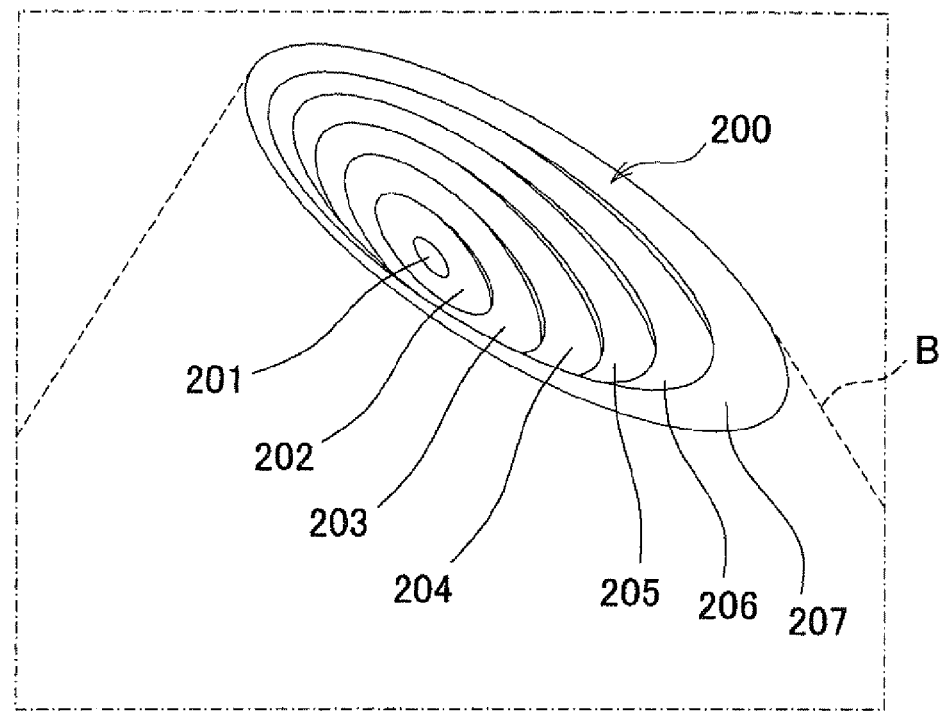
FIG. 17 is a perspective view illustrating a configuration in the vicinity of a scan beam reflector of the laser radar illustrated in FIG. 15.
Figure 18:
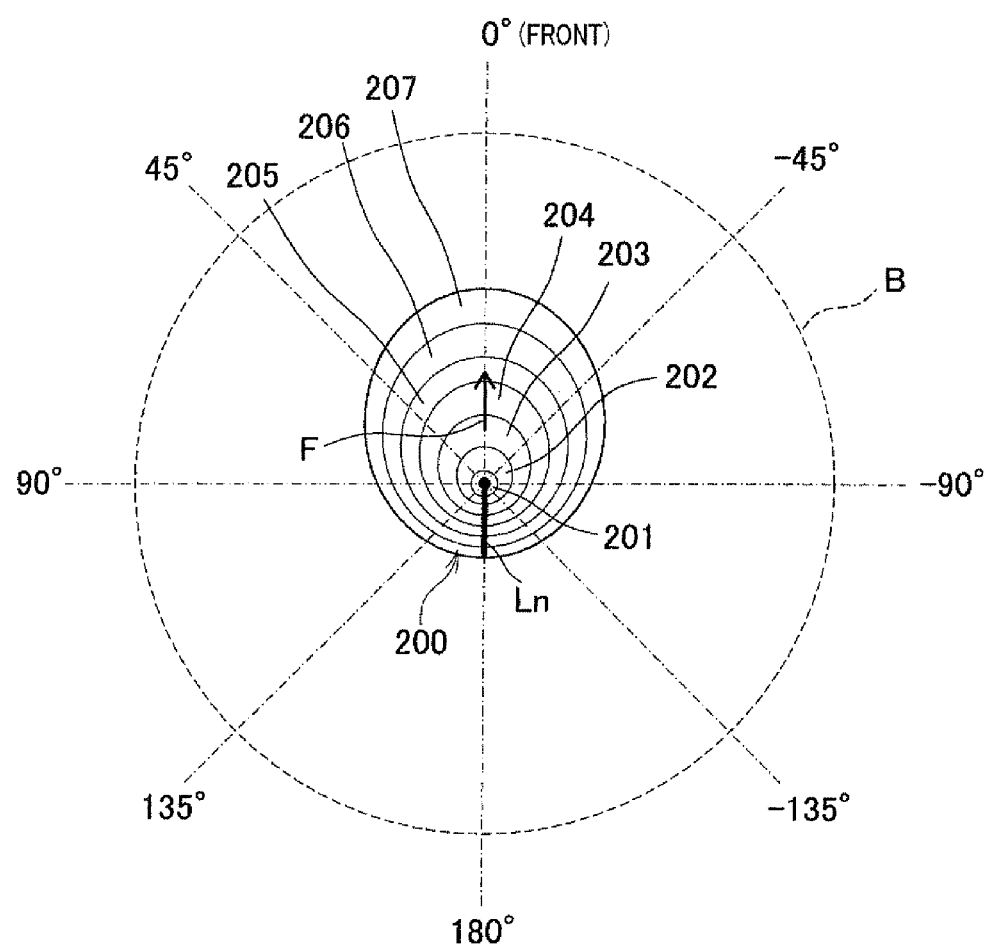
FIG. 18 is a plan view illustrating a configuration in the vicinity of the scan beam reflector of the laser radar illustrated in FIG. 15.
Figure 19A:
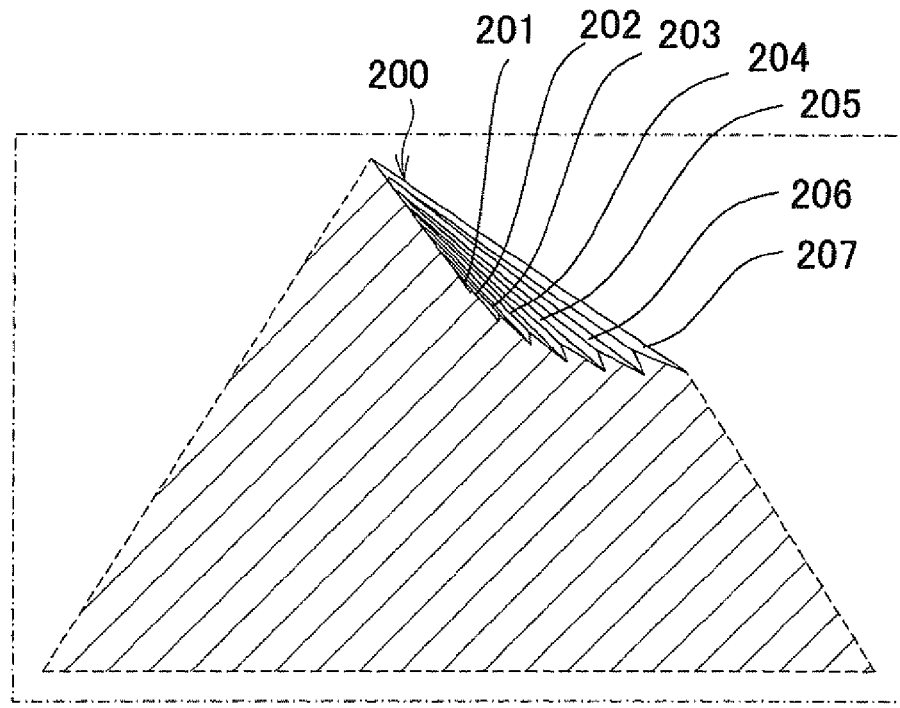
FIG. 19A is a schematic cross-sectional view taken along an azimuth direction of 0° to 180° of FIG. 18.
Figure 19B:
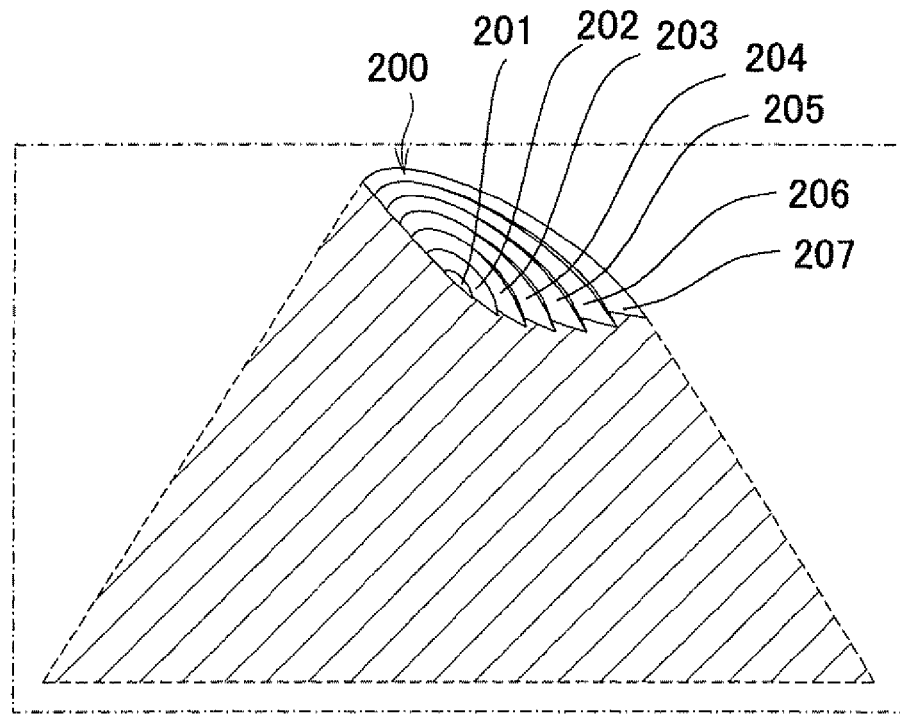
FIG. 19B is a schematic cross-sectional view taken along an azimuth direction of 45° to −135° of FIG. 5.

FIG. 15 is a schematic perspective view illustrating the vicinity of a concave mirror of a laser radar according to the second embodiment. FIG. 16 is a diagram illustrating a correlation between angle of laser beam radiated to a deflector and radiation angle from the deflector, according to the second embodiment. FIG. 17 is a perspective view illustrating a configuration in the vicinity of a scan beam reflector of the laser radar illustrated in FIG. 15. FIG. 18 is a plan view illustrating a configuration in the vicinity of the scan beam reflector of the laser radar illustrated in FIG. 15. FIG. 19A is a schematic cross-sectional view taken along an azimuth direction of 0° to 180° of FIG. 18. FIG. 19B is a schematic cross-sectional view taken along an azimuth direction of 45° to −135° of FIG. 5.

In the present embodiment as well, the seat B may be embedded in the deflector or omitted if the scan beam reflector is exposed.

The laser radar according to the second embodiment is different from the laser radar 1 according to the first embodiment only in the configuration of the scan beam reflector and the scan range of the laser beam from the mirror 31. The remaining configuration is the same as that of the first embodiment. Accordingly, the components identical with or similar to those in the first embodiment are given the same is reference numerals for the sake of omitting unnecessary explanation. The configuration as shown in FIG. 1 is applied to the second embodiment and thus, in the description set forth below, FIG. 1 is referred to where necessary.

As shown in FIG. 15, the deflecting region (deflecting surface) of the deflector 41 is also divided into a reflecting region of a scan beam reflector 200 and a reflecting region (reflecting area 130*a*) of the concave mirror 130. Of these regions, the reflecting region of the scan beam reflector 200 includes a plurality of annular reflecting surfaces 201 to 207 which are multi-stepped and coaxially arranged centering on the central axis 42*a*. In the present embodiment as well, the orientation of the deflector 41 is defined by the direction of the horizontal component (see the arrow F of FIG. 18) of the reflected laser beam L1 when it is incident on the position P2 (position where the central axis 42*a* intersects a reflecting surface 201) in the deflector 41.

The reflecting surface 201 corresponds to a central area of the coaxially configured scan beam reflector 200. The reflecting surface 201, which is substantially circular in a plan view, is arranged on the central axis 42*a* being inclined with respect to the central axis 42*a*. The reflecting surface 201 is formed covering the whole peripheral region along the circumference, centering on the central axis 42*a*. Accordingly, the reflecting surface 201 is formed along the entire circumference.

As shown in FIGS. 15, 17, 18 and 19, centering on the reflecting surface 201, a second, third, fourth, fifth, sixth and seventh reflecting surfaces 202, 203, 204, 205, 206 and 207 are sequentially annularly arranged from the inner side to the outer side. Each of the reflecting surfaces 202 to 207 is continuous throughout the circumference without being provided with a step, and arranged around the central axis 42*a*. Accordingly, for each of the reflecting surfaces 202 to 207, the whole peripheral region throughout the circumference corresponds to the forming region.

The plurality of reflecting surfaces 201 to 207 configured as described above have a different inclination with respect to the plane (horizontal plane) perpendicular to the central axis 42*a*. Specifically, like the reflecting structure shown in the first embodiment, by way of example, the reflecting surfaces 201 to 207 are configured as paraboloids (rotary parabolic curved surface) having different curvatures, that is, different curvature radiuses. These reflecting surfaces 201 to 207 are ensured to have a smaller curvature as the surfaces are located closer to the center and to have a larger curvature as the surfaces are located closer to the outer periphery. For example, the reflecting surface 203 has a curvature radius larger than that of the reflecting surface 202, and the reflecting surface 204 has a curvature radius larger than the reflecting surface 203. Of course, a relationship between the positions of the reflecting surfaces in the scan beam reflector 200 and largeness of the curvature radiuses (curvatures) depends on design. This is also true of the second embodiment, similarly to that described in the first embodiment.

More specifically, let us assume a cross section obtained by cutting the scan beam reflector 200 along the direction F (see FIG. 18), passing through the central axis 42*a*. The reflecting surfaces are configured such that the outline of each of the reflecting surfaces forms a parabola. FIG. 16 schematically illustrates a geometric correlation in a cross section obtained by cutting the scan beam reflector 200 in the X-Y plane when the azimuth of the deflector 41 (direction F of FIG. 18) coincides, as shown in FIG. 1, with the positive direction of the X axis. In FIG. 16, the deflecting are 200a (reflecting surfaces 201 to 207) of the scan beam reflector 200, as shown by its outline in the cross section taken along the X-Y plane, has a reference inclination angle α (inclination angle with respect to the horizontal plane) of 45° or more.

In FIG. 16, the curve of the reflecting surface at a position Pr corresponds to the parabola expressed by the following Formula (4). In Formula (4), the position Pr is an incident position in the deflecting surface 200a when the laser beam L1 has an inclination angle θ(θ≤0°) with respect to the central axis 42a. In Formula (4) as well as the subsequent Formula (5), t indicates a parameter and L indicates a distance between the positions P1 and P2. Further, in these formulas, β and θ may have any values provided that θ≤0°. In FIG. 16, when θ=0° is established, for example, β has a minimum value (β min) of 90-2α°.

$$\begin{bmatrix} x \\ y \end{bmatrix} = \begin{bmatrix} \cos\theta & \sin\theta \\ -\sin\theta & \cos\theta \end{bmatrix} \cdot \begin{bmatrix} \cos(90-2\alpha) & \sin(90-2\alpha) \\ -\sin(90-2\alpha) & \cos(90-2\alpha) \end{bmatrix} \cdot \begin{bmatrix} \frac{t^2}{4a} - a \\ t \end{bmatrix} \quad (4)$$

The value "a" in Formula (4) may be expressed by the following Formula (5).

$$a = \frac{L(1-\sin[2\theta+2\alpha-90])}{2(\cos\theta - \sin\theta \cdot \tan\alpha)} \quad (5)$$

Further, the reflecting surface (reflecting surface as the position Pr), whose outline in the cross section taken along the X-Y plane is expressed by the above parabola (Formula (4)), has a paraboloid obtained by rotating the reflecting surface about an axis expressed by the following Formula (6).

$$y = \tan(90-2\alpha-\theta) \cdot x \quad (6)$$

In this case, the inclination angle β, with respect to the horizontal plane, of the laser beam L1 reflected at the position Pr is expressed by the following Formula (7).

$$\beta = 90 - 2\alpha - \theta \quad (7)$$

The position Pr may be regarded as being a position on the X-Y plane (when the direction F coincides with the positive direction of the X axis) in the reflecting surface 202, 203, 204, 205, 206 or 207, and as locating at a level higher than the position P2. Thus, substituting -θ at a position in the reflecting surface 202, 203, 204, 205, 206 or 207 into Formulas (4) and (5) of parabola and Formula (6) of rotational axis, the paraboloid (i.e. the reflecting surface 202, 203, 204, 205, 206 or 207) for the position can be formed.

In the laser radar of the present embodiment as well, the actuator 33 is driven and controlled by the control circuit 70 shown in FIG. 16 to change the inclination of the mirror 31. Thus, the laser beam L1 reflected from the mirror 31 toward the deflector 41 is scanned, so that the laser beam L1 moves within the virtual plane. The virtual plane corresponds to a plane including the path of the laser beam L1 from the collimating lens 60 toward the mirror 31 and including the central axis 42a. In FIG. 1, for example, the virtual plane corresponds to the X-Y plane including the position P1 as an origin. The laser beam L1 moves within the virtual plane with the pivotal movement of the mirror 31. Thus, the line scanning is conducted to the scan beam reflector 200 which is arranged intersecting the virtual plane.

Reference Ln in FIGS. 15 and 20 to 22 indicates a line scan position in the scan beam reflector 200. As can be seen from these figures, the line scan position draws a linear line (linear line within a predetermined range), in a plan view. In the present embodiment, the angle (displacement) of the mirror 31 is controlled so that the laser beam L1 moves only on one side with respect to the central axis 42a in the virtual plane. Thus, the line scanning of the laser beam L1 is ensured to be conducted to the deflecting surface only on one side with respect to the central axis 42a. Accordingly, the line scan position Ln is provided only on one side with respect to the central axis 42a (only along the direction 180°).

Figure 20:
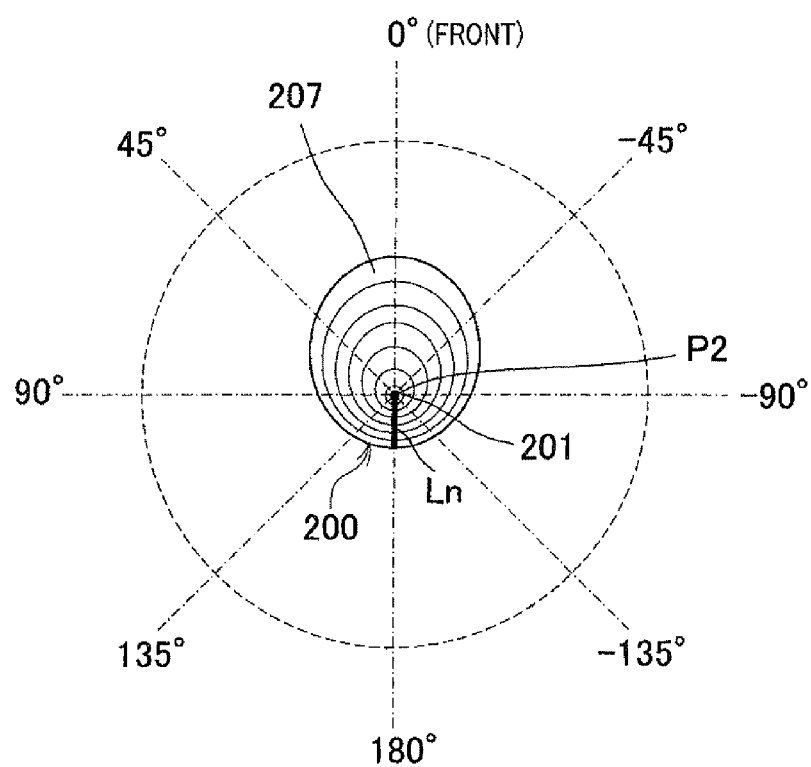
FIG. 20 is a schematic plan view of the laser radar illustrated in FIG. 15, in which the scan beam reflector is directed to an azimuth direction of 0°.
Figure 21:
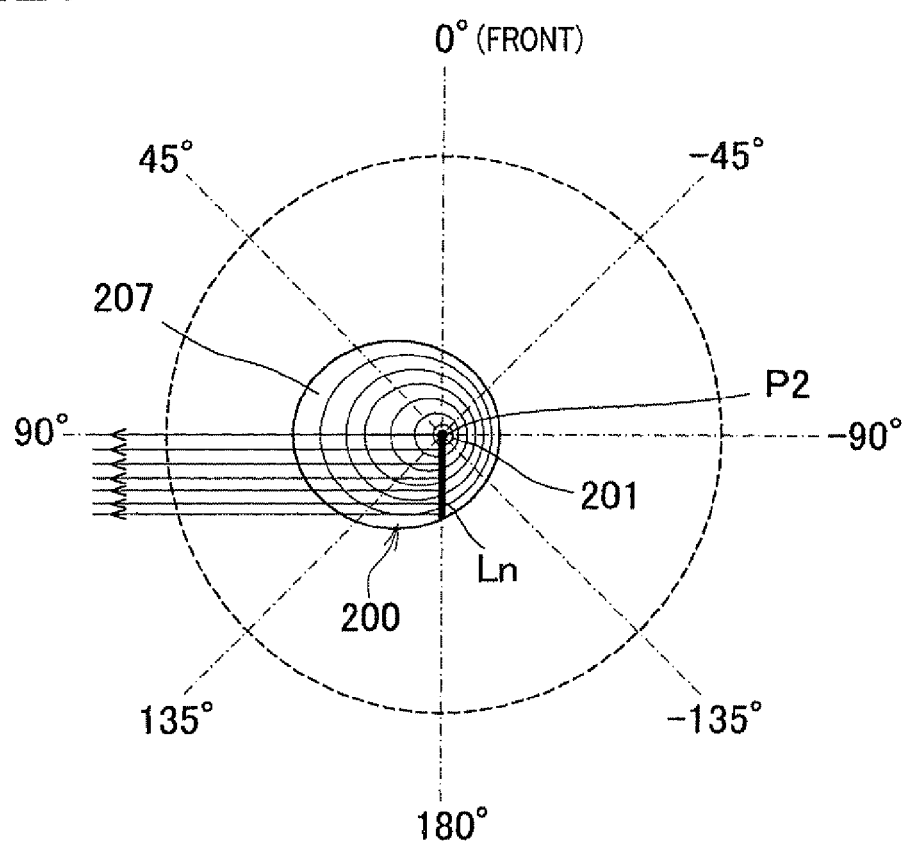
FIG. 21 is a schematic plan view illustrating a position of laser beam scan and laser beam radiation when the scan beam reflector is oriented to an azimuth direction of 90°, in the laser radar illustrated in FIG. 15.
Figure 22:
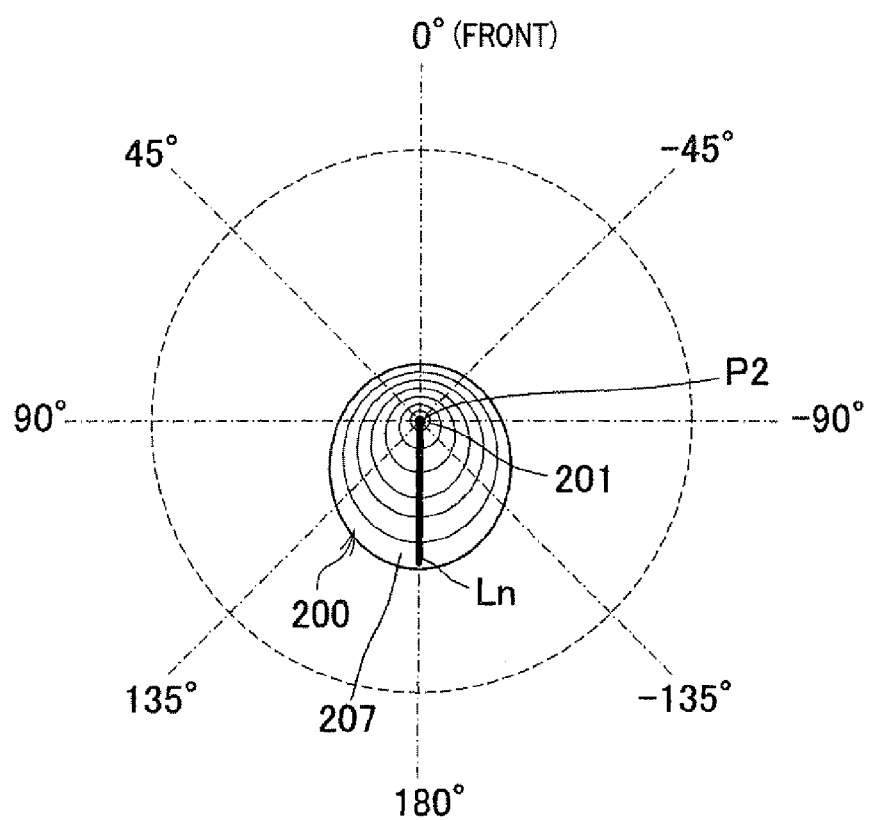
FIG. 22 is a schematic plan view illustrating a position of laser beam scan when the scan beam reflector is oriented to an azimuth direction of 180°, in the laser radar illustrated in FIG. 15.
Figure 23A:
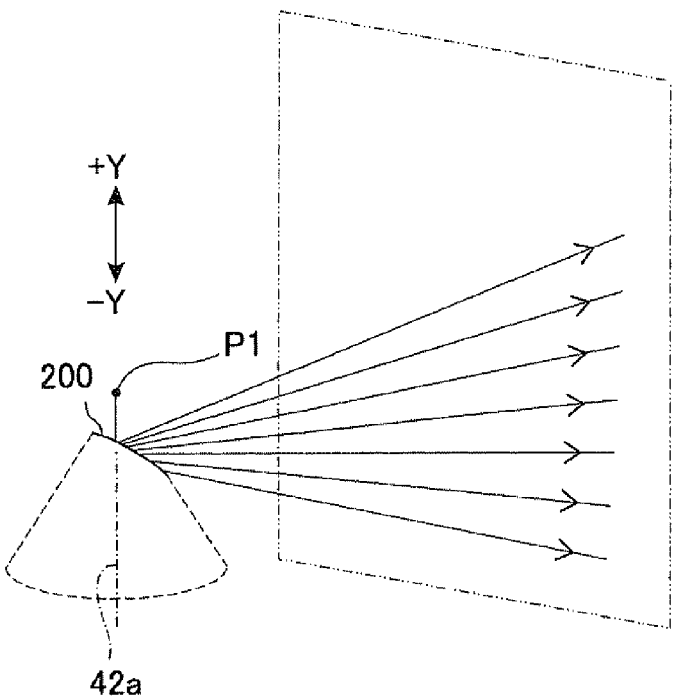
FIGS. 23A and 23B are schematic perspective views illustrating laser beam radiation when the scan beam reflector is directed in azimuth directions of −60° and −45°, respectively, in the laser radar illustrated in FIG. 15.
Figure 23B:
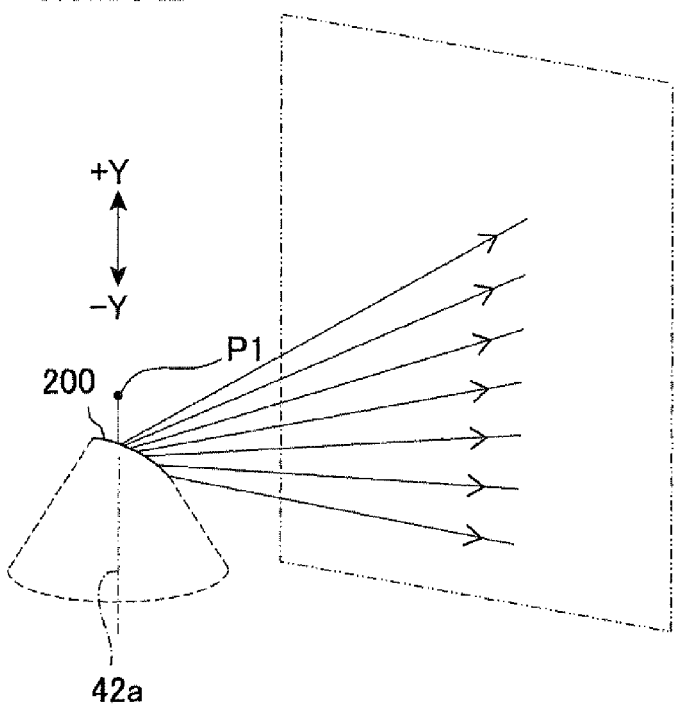
Figure 24A:
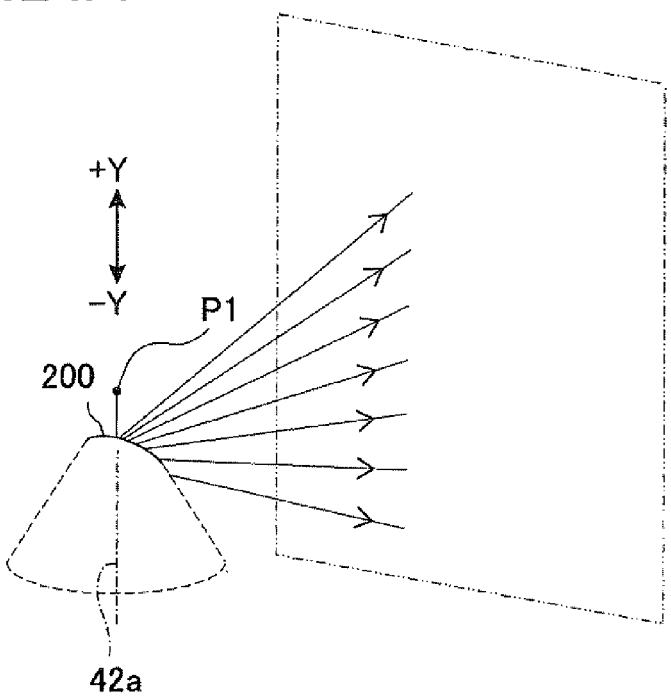
FIGS. 24A and 24B are schematic perspective views illustrating laser beam radiation when the scan beam reflector is directed in azimuth directions of −30° and −15°, respectively, in the laser radar illustrated in FIG. 15.
Figure 24B:
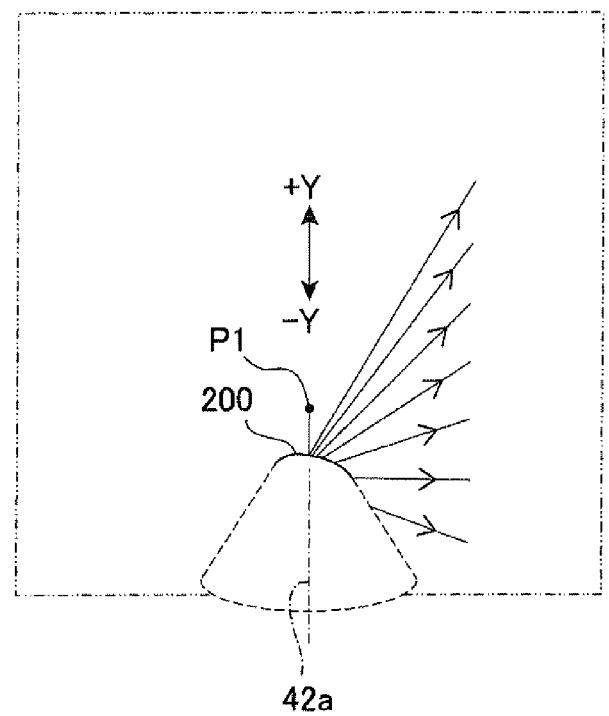
Figure 25:
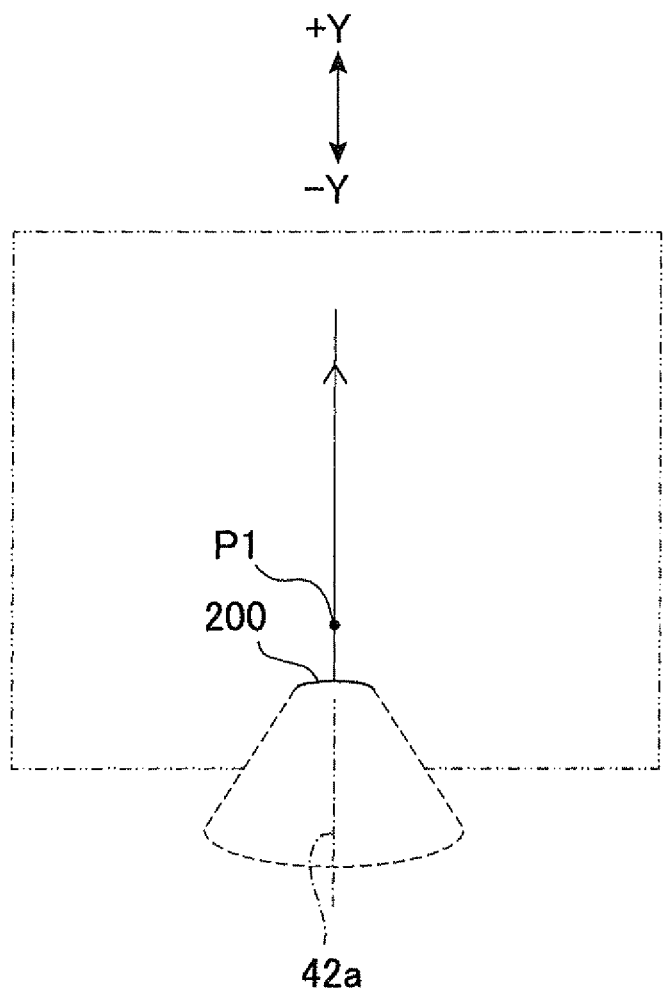
FIG. 25 is a schematic perspective view illustrating laser beam radiation when the scan beam reflector is directed in an azimuth direction of 0°, in the laser radar illustrated in FIG. 15.
Figure 26A:
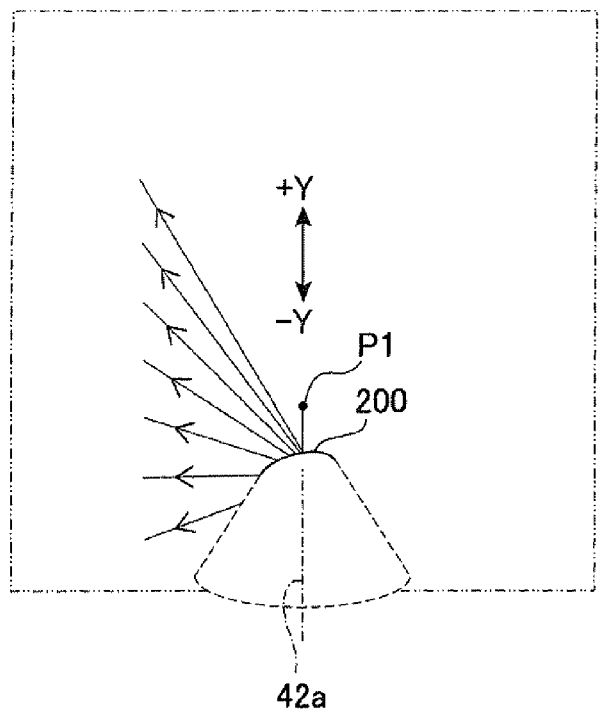
FIGS. 26A and 26B are schematic perspective views illustrating laser beam radiation when the scan beam reflector is directed in azimuth directions of 15° and 30°, respectively, in the laser radar illustrated in FIG. 15.
Figure 26B:
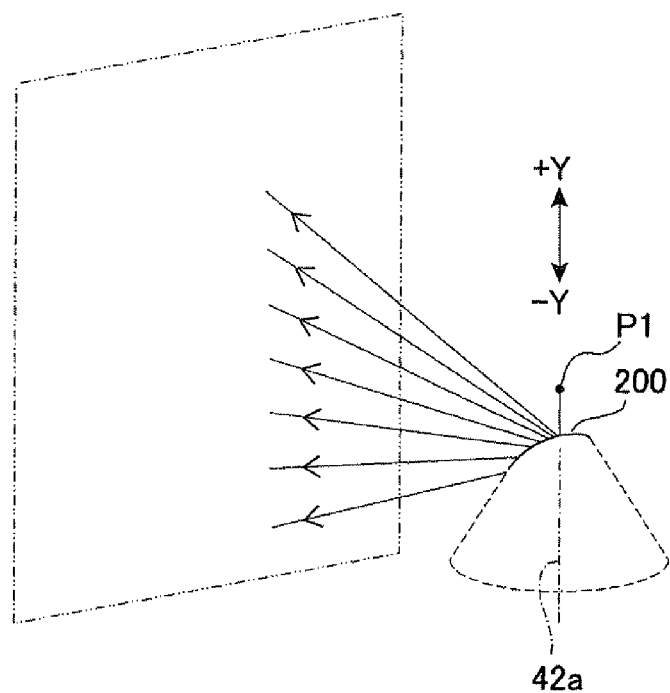
Figure 27A:
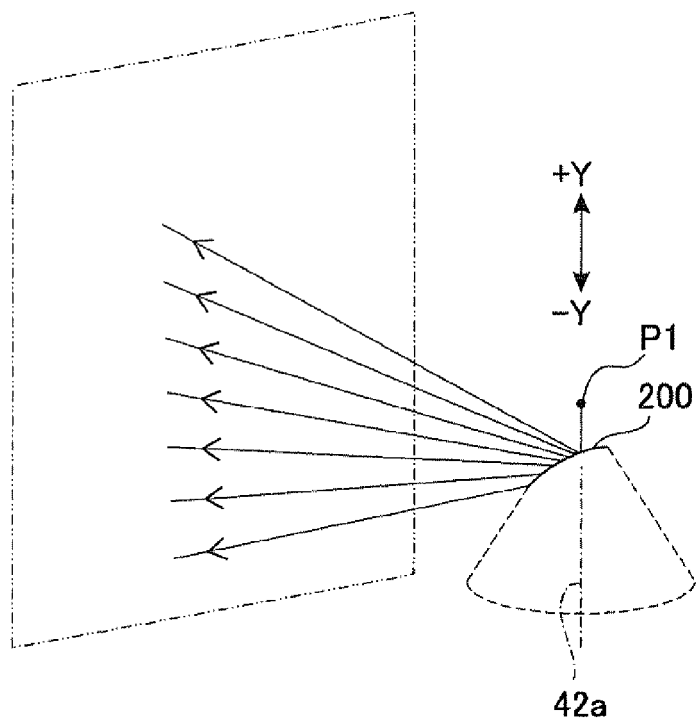
FIGS. 27A and 27B are schematic perspective views illustrating laser beam radiation when the scan beam reflector is directed in azimuth directions of 45° and 60°, respectively, in the laser radar illustrated in FIG. 15.
Figure 27B:
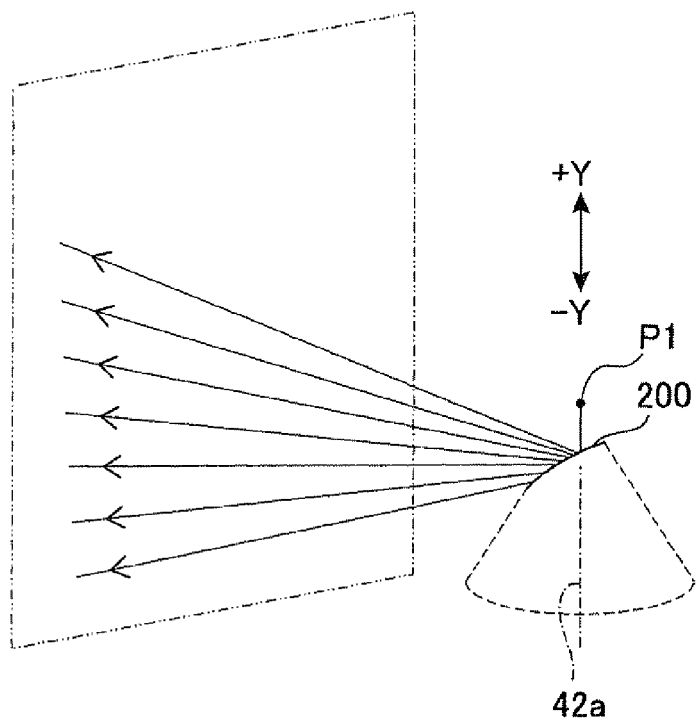

In the laser radar of the present embodiment as well, the scan range (the range the laser beam from the mirror 31 can move within the virtual plane) of the mirror 31 is fixed in the X-Y-Z coordinate system. Accordingly, when the deflector 41 is rotated (i.e. when the scan beam reflector 200 is rotated) as shown by FIGS. 20, 21 and 22, the line scan position Ln relatively moves on the plurality of reflecting surfaces 201 to 207 according to the rotation of the deflector 41.

In the process of the relative movement of the line scan position Ln, the line scan position is ensured to move crossing over the plurality of reflecting surfaces 201 to 207, at whichever position the deflector 41 may be located. Thus, in the positional relationship of the laser radar, the laser beam L1 is incident on all of the plurality of reflecting surfaces, at whichever position the deflector 41 may be located. Accordingly, when the orientation of the deflector 41 is changed through its sequential rotation as shown in FIGS. 23A, 23B, 24A, 24B, 25, 26A, 26B, 27A and 27B, the laser beam L1 is reflected by all of the reflecting surfaces by controlling the mirror 31. Thus, the laser beam L1 is radiated to the directions corresponding to the respective reflecting surfaces.

In the present embodiment as well, the control circuit 70 and the actuator 33 corresponding to the control means have a function of controlling the angle (displacement) of the mirror 31. Specifically, the control circuit 70 and the actuator 33 determine the range of changing the angle of the mirror 31 (first scanning member) and the parabolic curved surface (curvature) of the reflecting surfaces 201 to 207, so that the laser beam L1 to be moved within the virtual plane is incident only on a region of the scan beam reflector 200. Alternatively, the control circuit 70 and the actuator 33 may control the angle of the mirror 31 point by point according to the rotation angle of the deflector 41, so that the line scan position Ln shown in FIG. 15, for example, will not go out of the scan beam reflector 200 and will not enter the concave mirror 130.

In the present embodiment as well, a target detecting method similar to that of the first embodiment may be used. Thus, the method of calculating a distance to a target or a direction of the target is basically similar to that of the first embodiment.

FIGS. 23 to 27 each schematically illustrate a radiation path when the laser beam L1 is incident on the reflecting surfaces 201 to 207 at the respective rotational positions of the deflector 41. However, the degree of the speed of line scan at the line scan position Ln may be variously set.

In the present embodiment as well, raster scan similar to the first embodiment may be performed. For example, the orientation of the mirror 31 may be changed every time the deflector 41 rotates N times (N is a natural number). Thus, incident areas in the respective plurality of reflecting surfaces are shifted at every N number of rotations. For example, as shown in FIG. 17, the angle of the laser beam L1 from the mirror 31 may be changed in seven stages. In this case, the angle may be changed at every one rotation of the deflector 41 so that when seven rotations are completed, one cycle of seven-stage angle change is completed.

Figure 30:
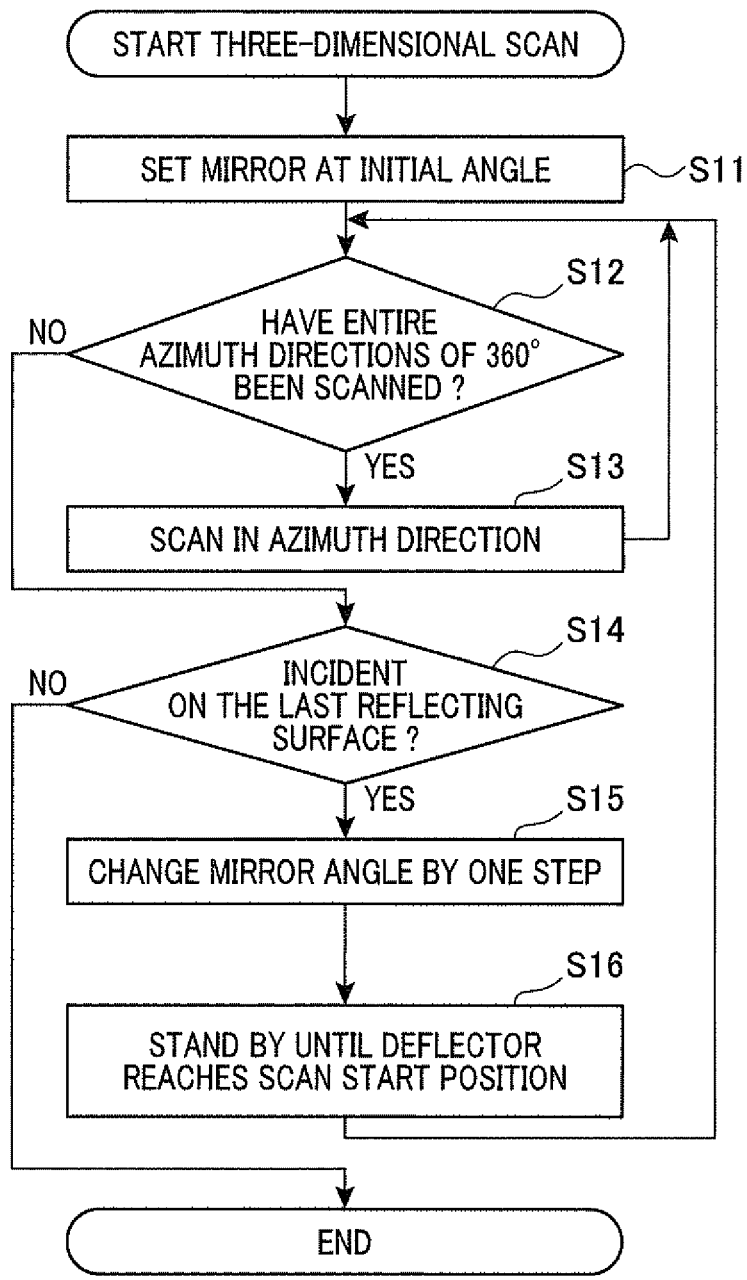
FIG. 30 is a flow diagram illustrating an outline of a control flow performed by a control circuit in order to carry out raster scanning, according to the second embodiment.

FIG. 30 shows a specific example of a control flow of the raster scan. The control flow shown in FIG. 30 is executed by the control circuit 70. The control flow is provided assuming that the motor 50 has already been driven and rotated at a fixed speed.

Upon start of three-dimensional scan, the control circuit 70 controls the actuator 33 to control the mirror 31 so as to be positioned at its initial angle (step S11). The initial angle corresponds, for example, to an angle at which the laser beam L1 is radiated to the center position of the circular reflecting surface 201 located at the center portion as shown in FIG. 17.

Then, the control circuit 70 determines whether or not an entire azimuth range of 360° (see FIG. 5) has been scanned (step S12). This determination is made based on a signal from the rotation angle sensor 52. If the determination is YES, the control circuit 70 commands the drive circuit 9 to have the laser diode 10 radiated a pulsed laser beam L1 at regular intervals (step S13). Thus, the laser beam L1 is radiated into the external space at regular intervals from the reflecting surface 201 at the center portion. Since the deflector 41 is rotated at a fixed speed, the laser beam L1 radiated into the external space is shifted as well in an azimuth direction on a fixed-angle basis to perform sequential scan. In other words, an azimuth (horizontal) direction scan covering the entire range thereof is performed. The processing of steps S12 and S13 is continued until the deflector 41 completes one rotation in the reference direction F. Thus, a lower-one-line scan is performed in the peripheral space covering the entire azimuth range of 360°.

After finishing the lower-one-line scan, a NO determination is made at step S12. Then, the control circuit 70 determines whether or not the mirror 31 has already been positioned at an angle at which the laser beam L1 is radiated to the outermost and last annular reflecting surface 207 located as shown in FIG. 17 (step S14).

If the determination at step S14 is YES, it means that scan of all of the seven lines has already been completed in the azimuth range of 360°. Thus, control ends at this moment. On the other hand, if the determination at step S14 is NO, it means that there still remain lines to be scanned. Accordingly, the control unit 70 controls the actuator 33 to change the angle of the mirror 31 by one step so that the laser beam L1 is radiated to a reflecting surface (e.g. reflecting surface 202) which is located radially outward by one step with respect to the reflecting surface to which the laser beam L1 has been radiated up to then (step S15). As described above, the radiation position for the annular reflecting surface is substantially at the center in the width direction of the reflecting surface.

Then, the control circuit 70 stands by until the reference direction F of the deflector 41 reaches the start position (e.g., position at an azimuth direction of 0°) (step S16). Then, control returns to step S12 described above.

In this way, while the deflector 41 is rotated at a fixed speed, the seven lines in the predetermined azimuth range of 360° are sequentially scanned. With this raster scan, three-dimensional scan is performed covering the entire azimuth range of 360° in the external space around the laser radar 1.

In the control described above, the angle of the mirror is changed for every one rotation of the deflector 41. Alternative to this, the angle of the mirror may be changed every time the deflector 41 rotates N number of times (N is a natural number). In this case, since the rotation angle sensor 52 outputs information indicating the number of rotations of the deflector 41, the control circuit 70 measures the number of rotations of the deflector 41 based on the information. The control circuit 70 uses the information on the number of rotations to monitor the N number of rotations of the deflector 41. Thus, the control circuit 70 performs three-dimensional control as described above.

In the case of this control flow, while the laser beam is incident on the individual reflecting surfaces, a fixed inclination angle of the laser beam with respect to the horizontal plane (angle with respect to each reflecting surface on which the laser beam is incident) is maintained, in spite of the rotation of the deflector 41 (maintained without causing any variation that would be ascribed to the presence of a step or the like). Similarly, when the reflecting surfaces are shifted subsequently, the fixed inclination angle of the laser beam with respect to the horizontal plane (angle with respect to each reflecting surface on which the laser beam is incident) is maintained, in spite of the rotation of the deflector 41, as far as the laser beam is incident on the reflecting surfaces.

Alternative to this, the Lissajous scan mentioned above may be used.

According to the laser radar of the present embodiment, advantages similar to those of the first embodiment may be enjoyed.

In the present embodiment, the plurality of reflecting surfaces 202 to 207 are configured to annularly surround the central axis 42a. Further, the control circuit 70 controls displacement of the mirror 31 so that the laser beam L1 moves only on one side with respect to the central axis 42a in the virtual plane. Thus, the line scanning of the laser beam L1 is ensured to be conducted to the deflecting surface only on one side with respect to the central axis 42a.

Further, the line scan position Ln of the laser beam L1 on the deflecting surface is ensured to cross over the plurality of reflecting surfaces 201 to 207, at whichever rotational position the deflector 41 may be located. In addition, the reflecting surfaces 201 to 207 are each configured to be continuous throughout the circumference centering on the central axis without being provided with a step.

With this configuration, the line scan position Ln is permitted to cross over the plurality of reflecting surfaces 201 to 207, at whichever rotational position the deflector 41 may be located at. Thus, the laser beam L1 is incident on the individual reflecting surfaces 201 to 207, whichever direction the deflector 41 may be oriented to.

In particular, since the reflecting surfaces 201 to 207 are each configured to be continuous throughout the circumference centering on the central axis without being provided with a step, a dead angle that would have been created due to the presence of a step will not be created. For example, if a step is formed in a part of a reflecting surface, the laser beam, when it is incident on the vicinity of the step, may be irregularly reflected in the vicinity of the step, creating a direction (dead angle) in which no laser beam is radiated. In this regard, the configuration of the present invention enables laser beam reflection in an appropriate direction matching the inclination of each reflecting surface, whichever circumferential position of the reflecting surface the laser beam L1 may be incident on. Thus, the laser radar of the present embodiment is able to well recognize a target in a three-dimensional manner in any azimuth direction through an angle of 360°.

(Modifications)

The present invention is not limited to the embodiments described above or illustrated in the drawings. For example, the examples as set forth below shall also be encompassed in the technical scope of the present invention.

In the embodiments described above, a stepping motor is used as the actuator for rotating the mirror 31 about the rotational axis G. Alternative to this, other well-known rotary actuators may be used.

In the embodiments described above, a member (deflector 41) is commonly used as a part (scan line reflector) for radiating a laser beam into an external space and a part (concave mirror) for reflecting the light reflected from a target present in the external space toward the photodiode. Alternatively, however, these parts may be configured as separate members that are ensured to be rotated in synchronization.

Figure 28:
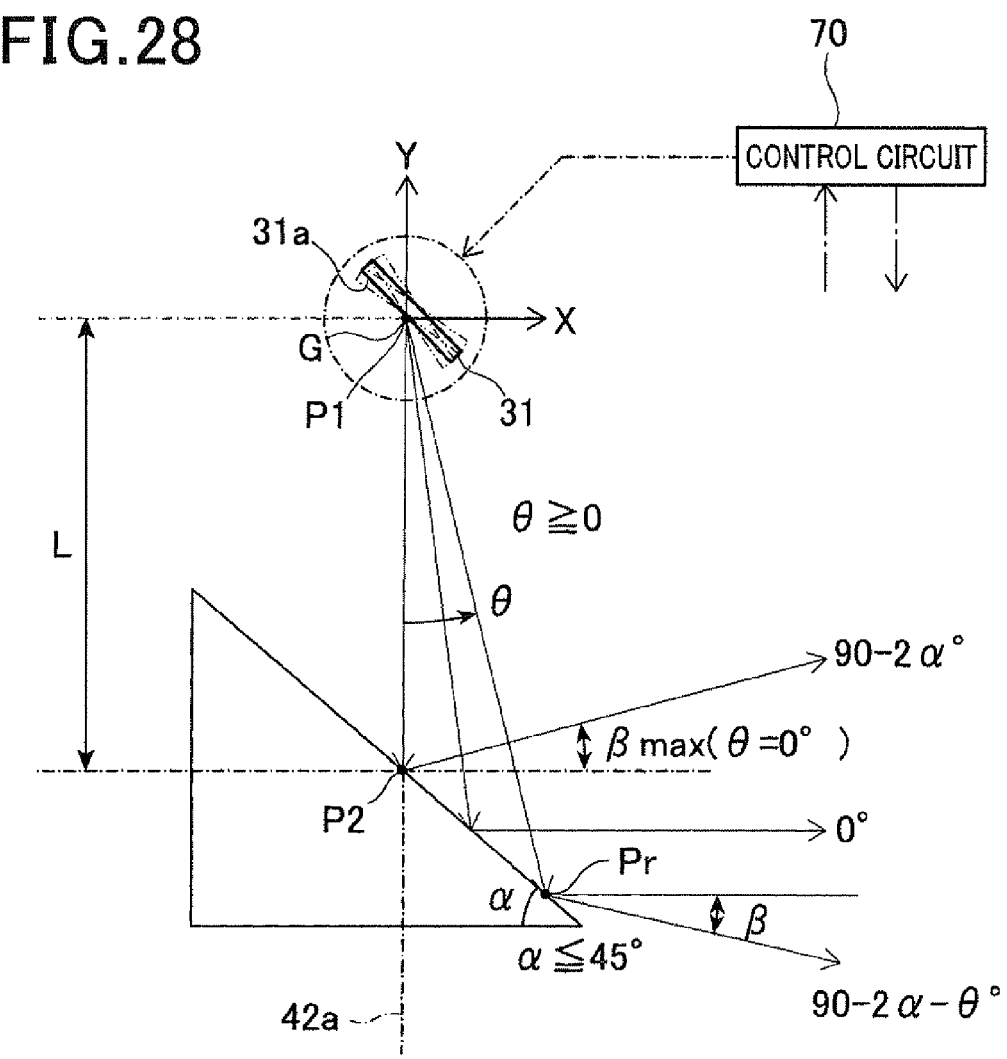
FIG. 28 is a diagram illustrating a correlation between angle of laser beam radiated to a deflector and radiation angle from the deflector, according to an example in which line scan is performed in a scan range different from those of FIGS. 15 and 16.

In the second embodiment, the angle α is set to 45° or more as shown in FIG. 16. However, the angle α may be set to 45° or less so that line scan is conducted, as shown in FIG. 28, on a side opposite to the side (on the side of the negative direction of the axis X with respect to the central axis 42*a*) in the virtual plane, where line scan is conducted as shown in FIG. 16. In this case as well, Formulas (4) and (5) of parabola and Formula (6) of rotational axis of the second embodiment may be applicable. In this modification as well, the values β and θ may each be set to any value (θ≥0°). In FIG. 28, when θ=0° is established, for example, β has a maximum value (β max) of 90-2α°.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutes and changes in the form of the methods and systems described herein may be made without departing from the spirit of the inventions. The accompanying claims and their equivalents are intended to cover such forms or modifications as would fall within the scope and spirit of the inventions.

What is claimed is:

1. A laser radar comprising:
   a laser beam generating means for generating a laser beam;
   a first scanning member for scanning the laser beam from the laser beam generating means in a virtual plane that passes through a predetermined axis;
   a control means for controlling a displacement of the first scanning member so that an angle of the scan beam in the plane is changed;
   a second scanning member for deflecting the laser beam scanned by the first scanning member and scanning the deflected laser beam toward an external space, the scan member being rotatable about the axis;
   a light detecting means for detecting reflected light that is the laser beam reflected in and returned from the external space;
   a light collecting means for collecting the reflected light to the light detecting means, the light collecting means being integrally formed with the second scanning member; and
   a driving means for driving and rotating both the second scanning member and the light collecting means about the axis, wherein:
   the second scanning member has a deflecting surface arranged on a side on which the laser beam is incident and formed to deflect the laser beam;
   the deflecting surface is formed at least in a portion of a region along a circumferential direction of the axis, the deflecting surface being a plurality of reflecting surfaces coaxially arranged centering on the axis; and
   the plurality of reflecting surfaces are each formed to have a different inclination with respect to a horizontal plane which is perpendicular to the axis.

2. The laser radar according to claim 1, wherein the deflecting surface is formed into an arc shape or an annular shape to surround the axis.

3. The laser radar according to claim 1, wherein the deflecting surface is formed covering an entire circumferential range around the axis.

4. The laser radar according to claim 3, wherein:
   the first scanning member is configured to scan the scan beam along the virtual plane and over a predetermined range including both of positive and negative sides with respect to the axis;
   the plurality of reflecting surfaces include a circular reflecting surface at a center portion through which the axis passes and one or more annular reflecting surfaces formed surrounding the circular reflecting surface; and
   the one or more annular reflecting surfaces have a step which is perpendicular to the axis and located to cross with the respective reflecting surfaces to enable the reflecting surfaces to share a vertical deflected range of the laser beam deflected by the second scanning member.

5. The laser radar according to claim 3, wherein:
   the first scanning member is configured to scan the scan beam along the virtual plane and over a predetermined range including one of positive and negative sides with respect to the axis; and
   the plurality of reflecting surfaces include a circular reflecting surface at a center portion through which the axis passes and one or more annular reflecting surfaces formed surrounding the circular reflecting surface.

6. The laser radar according to claim 4, wherein:
   the light collecting means has a concave reflecting surface;
   the second scanning member is arranged at the concave reflecting surface, being exposed therefrom; and
   the different inclinations of the plurality of reflecting surfaces are defined by different curvature radiuses such that a plurality of the laser beams incident at different incident angles from the first scanning member are reflected at desired angles by the second scanning member.

7. The laser radar according to claim 6, wherein the second scanning member is integrally formed with the light collecting means.

8. The laser radar according to claim 7, wherein:
   the first scanning member is a mirror that reflects the laser beam from the laser beam generating means;
   the control means serves as a means for changing an angle of the mirror in terms of a displacement; and
   the light collecting means includes a concave mirror that enables the collected reflected light to enter a light-receiving window of the light detecting means.

9. The laser radar according to claim 8, wherein the control means comprises:
   a rotation measuring means for measuring the number of rotations of the driving means;
   a determining means for determining whether or not the number of rotations measured by the rotation measuring means has become equal to N (N is a natural number); and
   a displacement control means for controlling the displacement of the first scanning member so that, when the number of rotations is determined to have reached N by the determining means, the laser beam from the first scanning member is radiated to reflecting surfaces which are different from those before the number of rotations has reached N.

10. The laser radar according to claim 8, wherein the control means comprises:
- a rotation measuring means for measuring the number of rotations of the driving means; and
- a displacement control means for controlling the displacement of the first scanning member so that, every time the number of rotations measured by the rotation detecting means is incremented by one, the laser beam from the first scanning member scans over the predetermined scan range along the virtual plane for a plurality of times.

11. The laser radar according to claim 4, wherein the control means comprises:
- a rotation measuring means for measuring the number of rotations of the driving means;
- a determining means for determining whether or not the number of rotations measured by the rotation measuring means has become equal to N (N is a natural number);
- a displacement control means for controlling the displacement of the first scanning member so that, when the number of rotations is determined to have reached N by the determining means, the laser beam from the first scanning member is radiated to reflecting surfaces which are different from those before the number of rotations has reached N; and
- a scan control means for allowing the first scanning member to perform scan only within a scan range in a plane which is perpendicular to the axis, the scan range being determined by an angle and a position of each step provided in a circumferential direction of the axis.

12. The laser radar according to claim 4, wherein the control means comprises:
- a rotation measuring means for measuring the number of rotations of the driving means;
- a displacement control means for controlling the displacement of the first scanning member so that, every time the number of rotations measured by the rotation detecting means is incremented by one, the laser beam from the first scanning member scans over the predetermined scan range along the virtual plane for a plurality of times; and
- a scan control means for allowing the first scanning member to perform scan only within a scan range in a plane which is perpendicular to the axis, the scan range being determined by an angle and a position of each step provided in a circumferential direction of the axis.

13. The laser radar according to claim 12, wherein a scan range in the plane which is perpendicular to the axis is equal to or less than 180°.

14. The laser radar according to claim 1, wherein the control means comprises:
- a rotation measuring means for measuring the number of rotations of the driving means;
- a determining means for determining whether or not the number of rotations measured by the rotation measuring means has become equal to N (N is a natural number);
- a displacement control means for controlling the displacement of the first scanning member so that, when the number of rotations is determined to have reached N by the determining means, the laser beam from the first scanning member is radiated to reflecting surfaces which are different from those before the number of rotations has reached N; and
- a scan control means for allowing the first scanning member to perform scan over an entire scan range of 360° along a circumferential direction of the axis.

15. The laser radar according to claim 1, wherein the control means comprises:
- a rotation measuring means for measuring the number of rotations of the driving means;
- a displacement control means for controlling the displacement of the first scanning member so that, every time the number of rotations measured by the rotation detecting means is incremented by one, the laser beam from the first scanning member scans over the predetermined scan range along the virtual plane for a plurality of times; and
- a scan control means for allowing the first scanning member to is perform scan over an entire scan range of 360° along a circumferential direction of the axis.

16. The laser radar according to claim 1, wherein:
- the light collecting means has a concave reflecting surface;
- the second scanning member is arranged at the concave reflecting surface, being exposed therefrom; and
- the different inclinations of the plurality of reflecting surfaces are defined by different curvature radiuses such that a plurality of the laser beams incident at different incident angles from the first scanning member are reflected at desired angles by the second scanning member.

17. The laser radar according to claim 1, wherein the second scanning member is integrally formed with the light collecting means.

18. The laser radar according to claim 1, wherein:
- the first scanning member is a mirror that reflects the laser beam from the laser beam generating means;
- the control means serves as a means for changing an angle of the mirror in terms of a displacement; and
- the light collecting means includes a concave mirror that enables the collected reflected light to enter a light-receiving window of the light detecting means.

19. The laser radar according to claim 4, wherein:
- the light collecting means has a concave reflecting surface;
- the second scanning member is arranged at the concave reflecting surface, being exposed therefrom; and
- the different inclinations of the plurality of reflecting surfaces are defined by different curvature radiuses such that a plurality of the laser beams incident at different incident angles from the first scanning member are reflected at desired angles by the second scanning member.

20. The laser radar according to claim 5, wherein:
- the light collecting means has a concave reflecting surface;
- the second scanning member is arranged at the concave reflecting surface, being exposed therefrom; and
- the different inclinations of the plurality of reflecting surfaces are defined by different curvature radiuses such that a plurality of the laser beams incident at different incident angles from the first scanning member are reflected at desired angles by the second scanning member.

* * * * *

UNITED STATES PATENT AND TRADEMARK OFFICE
CERTIFICATE OF CORRECTION

PATENT NO.        : 8,681,319 B2
APPLICATION NO.   : 13/423656
DATED             : March 25, 2014
INVENTOR(S)       : Hideyuki Tanaka et al.

Page 1 of 1

It is certified that error appears in the above-identified patent and that said Letters Patent is hereby corrected as shown below:

Title page, item (73) Assignee: should read as follows: Denso Wave Incorporated, Aichi-pref. (JP)

Signed and Sealed this
Twenty-ninth Day of July, 2014

Michelle K. Lee
*Deputy Director of the United States Patent and Trademark Office*